(12) United States Patent
Yokouchi

(10) Patent No.: US 10,836,181 B2
(45) Date of Patent: Nov. 17, 2020

(54) COLOR PREDICTION METHOD

(71) Applicant: SCREEN HOLDINGS CO., LTD., Kyoto (JP)

(72) Inventor: Kenichi Yokouchi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/519,812

(22) Filed: Jul. 23, 2019

(65) Prior Publication Data

US 2020/0031136 A1    Jan. 30, 2020

(30) Foreign Application Priority Data

Jul. 27, 2018   (JP) ................... 2018-140921

(51) Int. Cl.
*B41J 2/21* (2006.01)

(52) U.S. Cl.
CPC .................. *B41J 2/2103* (2013.01)

(58) Field of Classification Search
None
See application file for complete search history.

(56) References Cited

U.S. PATENT DOCUMENTS 7,573,608 B2    8/2009  Rich

FOREIGN PATENT DOCUMENTS

| EP | 1 649 409 A1 | 4/2006 |
|----|--------------|--------|
| EP | 2 717 556 A2 | 4/2014 |

OTHER PUBLICATIONS

K. Deshpande et al., "Recommendations for predicting spot color overprints", (http://www.color.org/ICC_white_paper_43_Draft2kd.doc), retrieved Jun. 7, 2018.
Robert Chung et al., "Predicting Color of Overprint Solid", Proceedings of the 36th IARIGAI Research Conference, Sep. 13, 2009, pp. 1-7.
Extended European Search Report issued in corresponding European Patent Application No. 19187542.6-1209, dated Jan. 7, 2020.

*Primary Examiner* — Alejandro Valencia
(74) *Attorney, Agent, or Firm* — McDermott Will & Emery LLP

(57) ABSTRACT

On the basis of a first calibration point corresponding to a reflectance of a state where a target ink or the like is applied on a transparent ink and a second calibration point corresponding to a reflectance of a state where the target ink is applied on a black ink that is applied on a base material, a third calibration point corresponding to a reflectance of a state where the target ink is solidly applied on a background having an average reflectance is obtained. A reflectance as a prediction value of a color corresponding to the reflectance of the entire background is obtained on the basis of the third calibration point and a fourth calibration point corresponding to a reflectance of a state where the target ink is applied on the base material.

10 Claims, 15 Drawing Sheets

COLOR PREDICTION METHOD

BACKGROUND OF THE INVENTION

Field of the Invention

The present invention relates to a color prediction method for predicting a color obtained by overprinting inks of a plurality of colors (in particular, a plurality of colors including a spot color).

Description of Related Art

In recent years, digital printing apparatuses have become popular in the printing industry. However, in the labeling and packaging field, printing (offset printing, gravure printing, flexographic printing, etc.) with printing apparatuses using printing plates (hereinafter referred to as a "conventional printing apparatus" or simply referred to as a "printing apparatus") is still often performed in recent years. Meanwhile, there is an increasing demand for quick delivery for design and content production, and when there are some changes in design or the like in a case in which a conventional printing apparatus is used, cost for recreation of the printing plate or retrogression of the process is high, which is a significant problem. In this respect, a digital printing apparatus does not use a printing plate, and thus, does not need an operation for exchanging or recreating the printing plate. That is, by adopting a digital printing apparatus, it is possible to carry out especially small-lot printing at low cost, and therefore, it is also possible to respond to the demand of quick delivery for design and content production at low cost.

Meanwhile, in the labeling and packaging field, spot colors tend to be often used for enhancing color expression.

For this reason, in order to perform printing with a digital printing apparatus using print data generated for printing with a conventional printing apparatus, it is necessary that colors obtained by overprinting spot color inks be predicted and the predicted colors be reproduced with the digital printing apparatus. In the following, prediction values of values (specifically, reflectance or tristimulus values X, Y, and Z in the CIE 1931 XYZ color space) identifying colors obtained by overprinting inks of a plurality of colors is referred to as an "overprint prediction value".

The "Recommendations for predicting spot color overprints" (http://www.color.org/ICC_white_paper_43_Draft2kd.doc) by K. Deshpande and P. Green discloses a method (hereinafter, referred to as "Deshpande et al. method") for relatively easily predicting colors (overprint prediction values) obtained by overprinting inks of a plurality of colors including a spot color. In the Deshpande et al. method, overprint prediction values are expressed as in the following Equations (1) to (3) using tristimulus values X, Y, and Z (see FIG. 19).

$$X = j_x \times (X_b \times X_f) + k_x \quad (1)$$

$$Y = j_y \times (Y_b \times Y_f) + k_y \quad (2)$$

$$Z = j_z \times (Z_b \times Z_f) + k_z \quad (3)$$

Here, $X_b$, $Y_b$, and $Z_b$ are tristimulus values of a background color, $X_f$, $Y_f$, and $Z_f$ are tristimulus values of a foreground color, $j_x$, $j_y$, and $j_z$ are scaling coefficients, and $k_x$, $k_y$, and $k_z$ are constants. Hereinafter, $j_x$, $j_y$, $j_z$, $k_x$, $k_y$, and $k_z$ are collectively referred to as "overprint coefficient".

Meanwhile, color reproduction methods include additive color mixing and subtractive color mixing. In the case of printing, the subtractive color mixing is applied for color reproduction. In this regard, if ideal subtractive color mixing is performed, the stimulus value X of the color obtained by overprinting is represented by "$X_b \times X_f$" (the same applies to the stimulus values Y and Z), for example. However, in order to obtain a more accurate value, it is necessary to make a correction in consideration of an error caused by the use of an opaque ink and reflection of light on the surface. Therefore, in the Deshpande et al. method, a correction using a linear equation is performed as shown in the above Equations (1) to (3).

In the Deshpande et al. method, a color chart as schematically shown in FIG. 20 is used, for example. This color chart is called a "C×F chart". In the example shown in FIG. 20, the C×F chart is composed of twenty-two patches. The eleven patches in the upper part are patches obtained by printing an ink of a target spot color on a base material such as paper at a dot percentage in increments of 10%. The eleven patches in the lower part are patches obtained by printing an ink of a target spot color on black (black solid) at a dot percentage in increments of 10%. The overprint prediction value is calculated using the value (colorimetry value) obtained by the colorimetry of the patches in the C×F chart described above.

Hereinafter, the Deshpande et al. method will be described in detail with reference to the flowchart in FIG. 21, taking, as an example, calculation of an overprint prediction value in the case where a background color is a spot color at a dot percentage of 40% (referred to as a "spot color 1" for convenience) and a foreground color is another spot color at a dot percentage of 60% (referred to as a "spot color 2" for convenience).

First, the C×F chart is printed using the ink of spot color 1, and further, the C×F chart is printed using the ink of spot color 2 (step S900).

Next, the overprint coefficients $j_x$, $j_y$, $j_z$, $k_x$, $k_y$, and $k_z$ of the above Equations (1) to (3) regarding the spot color 2 are calculated using the C×F chart printed using the ink of spot color 2 (referred to as "spot color 2 chart" for convenience) (step S910). In this regard, focusing on the above Equation (1), for example, the practical maximum value and the minimum value for $X_b \times X_f$ are values obtained by the ink of the spot color 2 being applied on the base material and black (black solid), respectively. The same applies to $Y_b \times Y_f$ and $Z_b \times Z_f$. Therefore, in order to calculate the overprint coefficient, in a coordinate system representing the above Equations (1) to (3) (see FIG. 22.

Note that FIG. 22 shows only the coordinate system representing the above Equation (1)), the coordinates representing the stimulus value of a state where the ink of the spot color 2 at a dot percentage of 60% is applied on black are defined as a first calibration point P91, and the coordinates representing the stimulus value of a state where the ink of the spot color 2 at a dot percentage of 60% is applied on the base material are defined as a second calibration point P92.

Focusing on, for example, X among the tristimulus values, values are assigned as follows for the first calibration point P91 with respect to the above Equation (1). The value obtained by colorimetry of the patch PA93 in the spot color 2 chart (black stimulus value) is assigned to $X_b$, the value obtained by colorimetry of the patch PA92 in the spot color 2 chart (stimulus value of a state where the ink of the spot color 2 at a dot percentage of 60% is applied on the base material) is assigned to $X_f$, and the value obtained by colorimetry of the patch PA91 in the spot color 2 chart (stimulus value of a state where the ink of the spot color 2 at a dot percentage of 60% is applied on black) is assigned to X (see FIG. 20). In addition, for the second calibration point P92, values are assigned as follows with respect to the above Equation (1). The value obtained by colorimetry of the patch PA94 in the spot color 2 chart (stimulus value of base material) is assigned to $X_b$, the value obtained by colorimetry of the patch PA92 in the spot color 2 chart (stimulus value of a state where the ink of the spot color 2 at a dot percentage of 60% is applied on the base material) is assigned to $X_f$ and X (see FIG. 20).

The overprint coefficients $j_x$ and $k_x$ are calculated by solving a simultaneous equation consisting of the equation relating to the first calibration point P91 and the equation relating to the second calibration point P92. That is, an equation representing a straight line denoted by reference numeral L91 in FIG. 22 is obtained. The overprint coefficients $j_y$, $j_z$, $k_y$, and $k_z$ are similarly calculated.

Although the patches are provided in 10% increments in the C×F chart shown in FIG. 20, and an overprint coefficient corresponding to the dot percentage between two patches which are adjacent to each other in the horizontal direction can be obtained on the basis of the colorimetric values obtained by linear interpolation.

Next, the values of $X_b$, $Y_b$, and $Z_b$ (tristimulus values of the background color) for calculating final overprint prediction values in the above Equations (1) to (3) are obtained using the C×F chart printed using the ink of spot color 1 (referred to as "spot color 1 chart" for convenience) (step S920). Specifically, the values of $X_b$, $Y_b$, and $Z_b$ are obtained by colorimetry of the patch PA95 (see FIG. 20) in the spot color 1 chart.

Next, the values of $X_f$, $Y_f$, and $Z_f$ (tristimulus values of the foreground color) for calculating the final overprint prediction values in the above Equations (1) to (3) are obtained using the spot color 2 chart (step S930). Specifically, the values of $X_f$, $Y_f$, and $Z_f$ are obtained by colorimetry of the patch PA92 (see FIG. 20) in the spot color 2 chart.

Finally, the values obtained in steps S910 to S930 are substituted into the above Equations (1) to (3), whereby the tristimulus values X, Y, and Z as overprint prediction values are calculated (step S940). This corresponds to, for example, calculating, as the value of X, the ordinate value of the straight line L91 in FIG. 22 when the abscissa indicates the product of "$X_b$ calculated in step S920" and "$X_f$ calculated in step S930".

However, according to the Deshpande et al. method, color prediction cannot be accurately performed depending on the combination of a plurality of colors which are to be overprinted. In this regard, in the case where the prediction target is a combination of a plurality of relatively similar colors and the sum of dot percentages of the plurality of colors is nearly or less than about 100%, the color prediction is accurately performed. For example, color prediction is generally performed with high accuracy for a combination of PANTONE 166c (orange) and PANTONE 7406c (yellow) in a certain sample. On the other hand, prediction accuracy may be low in the cases where the prediction target is a combination of a plurality of greatly different colors, where the prediction target is a combination of three or more colors, and where the sum of the dot percentages of a plurality of colors greatly exceeds 100%. For example, in a certain sample, the prediction accuracy for the color obtained by overprinting PANTONE 7740c (green) at a dot percentage of 100%, PANTONE 166c (orange) at a dot percentage of 70%, and PANTONE 7406c (yellow) at a dot percentage of 30% is low. As described above, the color prediction accuracy by the Deshpande et al. method is not satisfactory.

SUMMARY OF THE INVENTION

In view of this, an object of the present invention is to provide a color prediction method with which a color obtained by overprinting inks of a plurality of colors (in particular, a plurality of colors including a spot color) is predicted more accurately than with a conventional method.

One aspect of the present invention is directed to a color prediction method for predicting a color obtained by sequentially overprinting, on a base material, inks of a first printing color to an Nth (N is an integer of 2 or more) printing color, the method including a first reflectance obtaining step of obtaining, as a first reflectance, a reflectance of a unit region with a state where an ink of the first printing color is applied on the base material, and a calculation step of calculating a reflectance of the unit region, the calculation step being executed (N−1) times, and in the calculation step, during a Kth (K is an integer of 1 or more and N−1 or less) execution, the reflectance of the unit region with a state where inks of the first printing color to a (K+1)th printing color are sequentially overprinted on the base material is calculater, wherein the calculation step includes:

a second reflectance calculation step of calculating, as a second reflectance, a reflectance of a printing region with a state where the ink of the first printing color is applied on the base material, when a value of the K is 1, and of calculating, as a second reflectance, a reflectance of a printing region with a state where an ink of a Kth printing color is overprinted on an ink of a (K−1)th printing color, when the value of the K is 2 or more;

a third reflectance calculation step of calculating, as a third reflectance, a reflectance of the unit region with a state where, assuming that a transparent ink is applied on the base material, an ink of a (K+1)th printing color is overprinted on the transparent ink;

a first conversion equation calculation step of obtaining a first conversion equation representing a line connecting first coordinates and second coordinates regarding a color prediction coordinate system where an abscissa represents a product of a reflectance of a background and a reflectance of a foreground and an ordinate represents a reflectance of a state where the background and the foreground overlap, the first coordinates corresponding to a combination of a product of a fourth reflectance that is a reflectance of the base material and a fifth reflectance that is a reflectance of a state where the ink of the (K−1)th printing color is applied on the base material, and the third reflectance, the second coordinates corresponding to a combination of a product of a sixth reflectance that is a reflectance of a state where a black ink is applied on the base material and the fifth reflectance, and a seventh reflectance that is a reflectance of a state where the ink of the (K+1)th printing color is overprinted on the black ink;

an eighth reflectance calculation step of calculating, as an eighth reflectance, a reflectance of a printing region with a state where the ink of the (K+1)th printing color is overprinted on the ink of the Kth printing color on the basis of the second reflectance and the fifth reflectance, using the first conversion equation;

a second conversion equation calculation step of obtaining a second conversion equation representing a line connecting third coordinates and fourth coordinates regarding the color prediction coordinate system, the third coordinates corresponding to a combination of a product of the second reflectance and the fifth reflectance, and the eighth reflectance, the fourth coordinates corresponding to a combination of a product of the fourth reflectance and the fifth reflectance, and the fifth reflectance; and a first reflectance update step of calculating a reflectance of the unit region with a state where the inks of the first printing color to the (K+1)th printing color are sequentially overprinted on the base material on the basis of the first reflectance and the fifth reflectance, using the second conversion equation, and of updating the first reflectance with the calculated reflectance.

According to such a configuration, in the Kth calculation step, the third reflectance which is the reflectance of the unit region with a state where, assuming that a transparent ink is applied on the base material, the ink of the (K+1)th printing color is overprinted on the transparent ink is obtained, and the eighth reflectance which is the reflectance of a state where the ink of the (K+1)th printing color is overprinted on the ink of the Kth printing color (reflectance of the portion where the inks are superimposed) is obtained in consideration of the third reflectance. Thus, a reflectance as a color prediction value is obtained on the basis of the eighth reflectance obtained in consideration of ink trapping as described above. Therefore, it is possible to predict a color obtained by overprinting of inks of a plurality of colors more accurately than ever.

Another aspect of the present invention is directed to a color prediction method for predicting a color obtained by sequentially overprinting, on a base material, inks of a first printing color to an Nth (N is an integer of 2 or more) printing color, the method including a first stimulus value obtaining step of obtaining, as a first stimulus value, a stimulus value of a unit region with a state where an ink of the first printing color is applied on the base material, and a calculation step of calculating a stimulus value of the unit region, the calculation step being executed (N−1) times, and in the calculation step, during a Kth (K is an integer of 1 or more and N−1 or less) execution, the stimulus value of the unit region with a state where inks of the first printing color to a (K+1)th printing color are sequentially overprinted on the base material is calculated, wherein the stimulus value is any of color tristimulus values X, Y, Z, and the calculation step includes:

a second stimulus value calculation step of calculating, as a second stimulus value, a stimulus value of a printing region with a state where the ink of the first printing color is applied on the base material, when a value of the K is 1, and of calculating, as a second stimulus value, a stimulus value of a printing region with a state where an ink of a Kth printing color is overprinted on an ink of a (K−1)th printing color, when the value of the K is 2 or more;

a third stimulus value calculation step of calculating, as a third stimulus value, a stimulus value of the unit region with a state where, assuming that a transparent ink is applied on the base material, an ink of a (K+1)th printing color is overprinted on the transparent ink;

a first conversion equation calculation step of obtaining a first conversion equation representing a line connecting first coordinates and second coordinates regarding a color prediction coordinate system where an abscissa represents a product of a stimulus value of a background and a stimulus value of a foreground and an ordinate represents a stimulus value of a state where the background and the foreground overlap, the first coordinates corresponding to a combination of a product of a fourth stimulus value that is a stimulus value of the base material and a fifth stimulus value that is a stimulus value of a state where the ink of the (K+1)th printing color is applied on the base material, and the third stimulus value, the second coordinates corresponding to a combination of a product of a sixth stimulus value that is a stimulus value of a state where a black ink is applied on the base material and the fifth stimulus value, and a seventh stimulus value that is a stimulus value of a state where the ink of the (K+1)th printing color is overprinted on the black ink;

an eighth stimulus value calculation step of calculating, as an eighth stimulus value, a stimulus value of a printing region with a state where the ink of the (K+1)th printing color is overprinted on the ink of the Kth printing color on the basis of the second stimulus value and the fifth stimulus value, using the first conversion equation;

a second conversion equation calculation step of obtaining a second conversion equation representing a line connecting third coordinates and fourth coordinates regarding the color prediction coordinate system, the third coordinates corresponding to a combination of a product of the second stimulus value and the fifth stimulus value, and the eighth stimulus value, the fourth coordinates corresponding to a combination of a product of the fourth stimulus value and the fifth stimulus value, and the fifth stimulus value; and a first stimulus value update step of calculating a stimulus value of the unit region with a state where the inks of the first printing color to the (K+1)th printing color are sequentially overprinted on the base material on the basis of the first stimulus value and the fifth stimulus value, using the second conversion equation, and of updating the first stimulus value with the calculated stimulus value.

Still another aspect of the present invention is directed to a color prediction method for predicting a color obtained by applying an ink of a first printing color on a base material at a first dot percentage, and overprinting an ink of a second printing color on the ink of the first printing color at a second dot percentage, the method including:

a first reflectance obtaining step of obtaining, as a first reflectance, a reflectance of a unit region with a state where the ink of the first printing color is applied on the base material at the first dot percentage;

a fifth reflectance obtaining step of obtaining, as a fifth reflectance, a reflectance of the unit region with a state where the ink of the second printing color is applied on the base material at the second dot percentage;

a third reflectance calculation step of calculating, as a third reflectance, a reflectance of the unit region with a state where the ink of the second printing color is assumed to be applied not on the base material but on a transparent ink, by correcting the fifth reflectance in consideration of a variation in at least one of a film thickness and a dot gain of the ink of the second printing color;

a seventh reflectance obtaining step of obtaining, as a seventh reflectance, a reflectance of the unit region with a state where a black ink is applied on the base material at a dot percentage of 100% and the ink of the second printing color is further applied on the black ink at the second dot percentage;

a first line setting step of determining a first line connecting first coordinates and second coordinates regarding a color prediction coordinate system where an abscissa represents a product of a reflectance of a background and a reflectance of a foreground and an ordinate represents a reflectance of a state where the background and the foreground overlap, the first coordinates corresponding to a combination of a product of a fourth reflectance that is a reflectance of the base material and the fifth reflectance, and the third reflectance, the second coordinates corresponding to a combination of a product of a sixth reflectance that is a reflectance of a state where a black ink is applied on the base material at a dot percentage of 100% and the fifth reflectance, and the seventh reflectance;

a third line setting step of determining a third line representing a product of the first reflectance and the fifth reflectance in the color prediction coordinate system;

a fourth coordinate setting step of determining, as fourth coordinates, coordinates corresponding to a combination of a product of the fourth reflectance and the fifth reflectance, and the fifth reflectance, in the color prediction coordinate system;

a virtual coordinate setting step of determining virtual coordinates on the first line, the virtual coordinates representing a reflectance of a state where the ink of the first printing color is applied on the base material at a dot percentage of 100% and the ink of the second printing color is applied on the ink of the first printing color at the second dot percentage;

a second line setting step of determining a second line connecting the virtual coordinates and the fourth coordinates in the color prediction coordinate system;

a rotation step of rotating the second line about the fourth coordinates such that, assuming overprint coordinates positioned on both the second line and the third line, the overprint coordinates proportionally divide the third line in a ratio based on the first dot percentage; and a color prediction step of predicting an ordinate value of the overprint coordinates determined in the rotation step as a color obtained by applying the ink of the first printing color on the base material at the first dot percentage and overprinting the ink of the second printing color on the ink of the first printing color at the second dot percentage.

These and other objects, features, modes, and advantageous effects of the present invention will become more apparent from the following detailed description of the present invention with reference to the accompanying drawings.

DETAILED DESCRIPTION OF PREFERRED EMBODIMENTS

<0. Prior Examination>

As described above, according to the Deshpande et al. method, color prediction cannot be accurately performed depending on the combination of a plurality of colors which are to be overprinted. It is considered that the reason of the inaccuracy is because a trapping state caused when inks of a plurality of colors are overprinted is not taken into account. Note that trapping indicates that an ink printed later is transferred onto an ink already printed.

Figure 1:
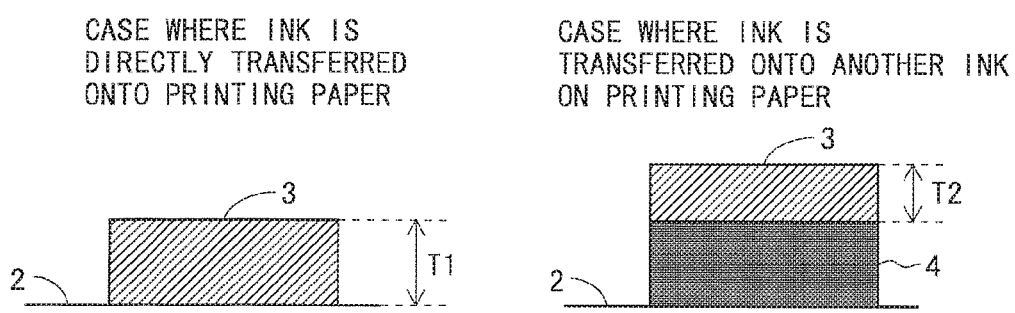
FIG. 1 is a diagram for describing trapping.

A conventional printing apparatus performs printing in such a way that, for example, an ink transferred onto a blanket cylinder is further transferred onto printing paper serving as a base material. Regarding this, in a case in which an ink 3 is transferred onto another ink 4 applied on the printing paper 2, a phenomenon (so-called trapping phenomenon) in which the film thickness of the ink becomes insufficient as compared to that in a case in which the ink 3 is directly transferred onto the printing paper 2 (that is, the case where no other inks are applied on the printing paper) may occur, as shown in FIG. 1. That is, regarding the film thickness of the ink 3 after the transfer, T2 in FIG. 1 is smaller than T1 in FIG. 1. Specifically, it has been reported by those skilled in the art that T2 is about 60% to 80% of T1 in thickness. Conversely, a phenomenon in which the film thickness of the ink is increased (so-called reverse trapping phenomenon) may occur. Such differences in film thickness are not taken into consideration in the Deshpande et al. method.

Further, in the Deshpande et al. method, an optical dot gain is also not considered. Note that the optical dot gain is a phenomenon in which halftone dots appear larger than their true size due to light scattering, reflection, absorption, or the like. It is considered that the color prediction accuracy is improved by taking the optical dot gain into account.

Therefore, in the following embodiment, color prediction is performed in consideration of the difference in ink film thickness and the optical dot gain in the case overprinting is performed. Hereinafter, an embodiment of the present invention will be described with reference to the accompanying drawings.

<1. Overall Configuration of Printing System>

Figure 2:
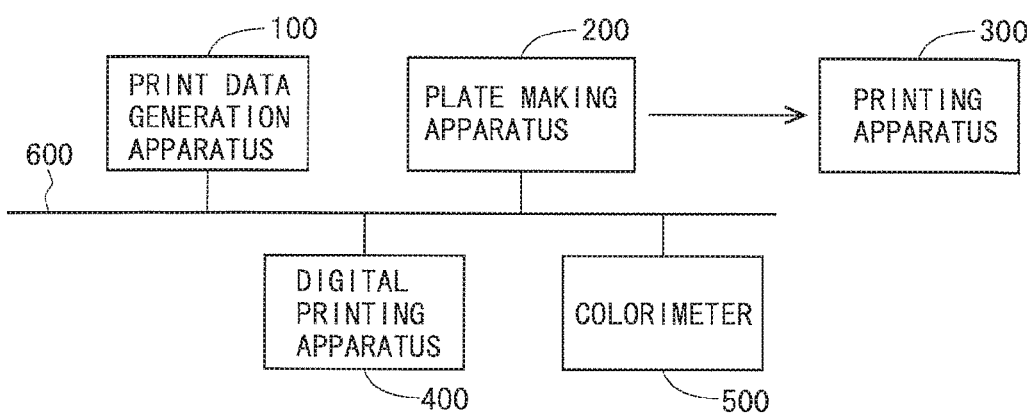
FIG. 2 is a diagram showing an overall configuration of a printing system for achieving a color prediction method according to an embodiment of the present invention.

FIG. 2 is a diagram showing an overall configuration of a printing system for achieving a color prediction method according to one embodiment of the present invention. The printing system includes: a print data generation apparatus 100 that generates print data by performing various processes on submitted data such as a PDF file; a plate making apparatus 200 that produces a printing plate on the basis of the print data; a printing apparatus 300 that performs printing using the printing plate produced by the plate making apparatus 200; a digital printing apparatus 400 such as an inkjet printer/copier that performs printing on the basis of the print data which is digital data without using the printing plate; and a colorimeter 500 for measuring a color. The print data generation apparatus 100, the plate making apparatus 200, the digital printing apparatus 400, and the colorimeter 500 are communicably interconnected by a communication line 600. Note that the colorimeter 500 used in the present embodiment is assumed to be a spectral colorimeter.

In the present embodiment, in the print data generation apparatus 100, when print data is generated on the basis of the submitted data, a color prediction process is performed to predict colors of pixel data included in the submitted data. This color prediction process is typically a process for predicting the color of a portion in which inks of a plurality of spot colors are overprinted or in which a spot color ink and a process color ink are overprinted. The print data generation apparatus 100 also generates print data for creating a C×F chart (see FIG. 20) required for the pre-processing of the color prediction process. Furthermore, the print data generation apparatus 100 also performs a process for converting the data obtained by the color prediction process into print data in a format that can be printed by the digital printing apparatus 400. The color prediction process and the pre-processing thereof will be described in detail later.

<2. Configuration of Print Data Generation Apparatus>

Figure 3:
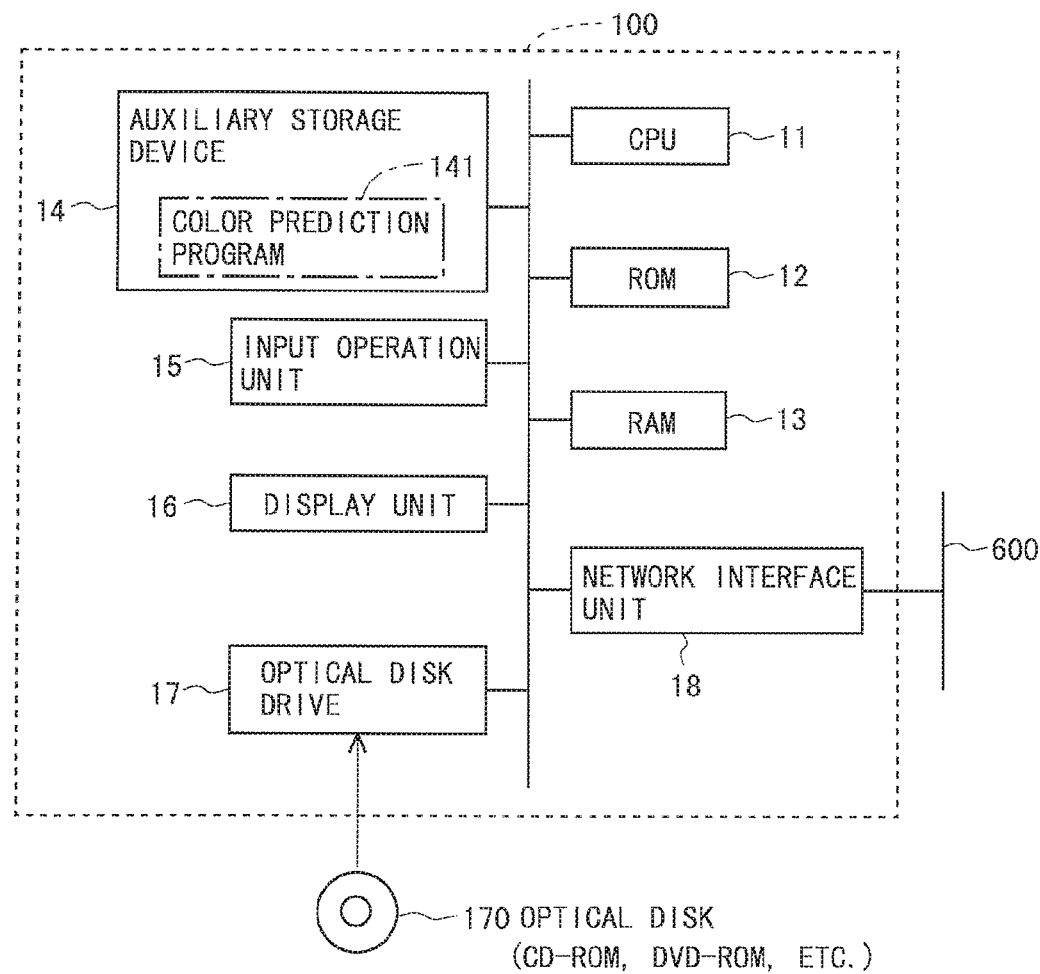
FIG. 3 is a diagram showing a hardware configuration of a print data generation apparatus in the embodiment.

FIG. 3 is a diagram showing a hardware configuration of the print data generation apparatus 100 in the present embodiment. The print data generation apparatus 100 is implemented by a personal computer, and includes a CPU 11, a ROM 12, a RAM 13, an auxiliary storage device 14, an input operation unit 15 such as a keyboard, a display unit 16, an optical disk drive 17, and a network interface unit 18. The submitted data transmitted via the communication line 600 is inputted into the print data generation apparatus 100 via the network interface unit 18. Print data generated by performing the color prediction process and the like by the print data generation apparatus 100 is sent to the digital printing apparatus 400 through the communication line 600 via the network interface unit 18.

A program 141 that performs the color prediction process (hereinafter, referred to as a "color prediction program") is stored in the auxiliary storage device 14. The color prediction program 141 is embedded, for example, in a program for performing a series of processes for generating print data for the digital printing apparatus 400 from the submitted data. The color prediction program 141 is provided by being stored in a computer readable recording medium such as a CD-ROM or a DVD-ROM. That is, the user purchases, for example, an optical disk (CD-ROM, DVD-ROM, etc.) 170 as a recording medium for the color prediction program 141, mounts the optical disk 170 on the optical disk drive 17, reads the color prediction program 141 from the optical disk 170, and installs the read program in the auxiliary storage device 14. Alternatively, the color prediction program 141 sent via the communication line 600 may be received by the network interface unit 18 and installed in the auxiliary storage device 14.

<3. Pre-Processing>

Figure 4:
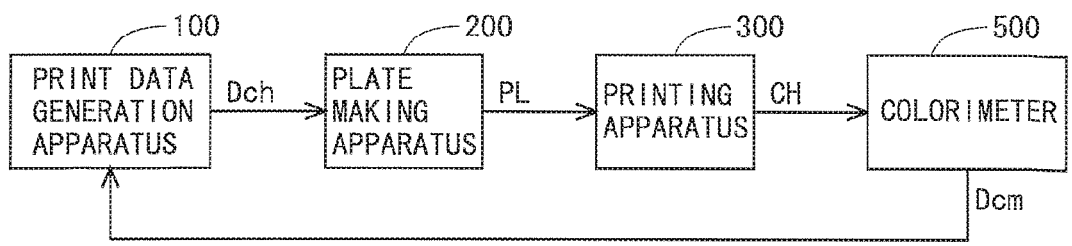
FIG. 4 is a block diagram for describing a flow of pre-processing in the embodiment.
Figure 20:
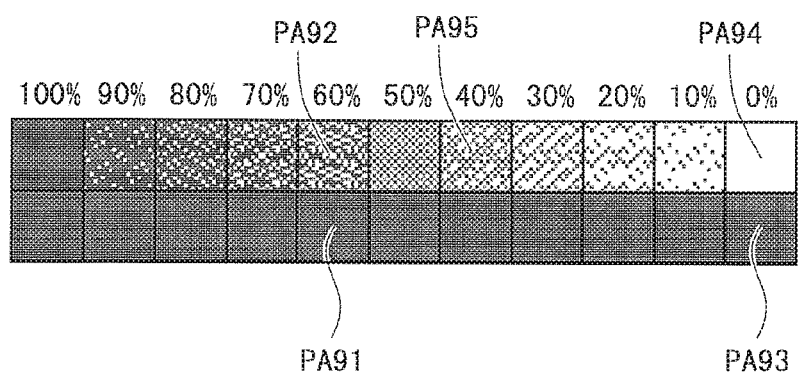
FIG. 20 is a diagram schematically showing an example of a C×F chart in relation to the conventional example.
Figure 21:
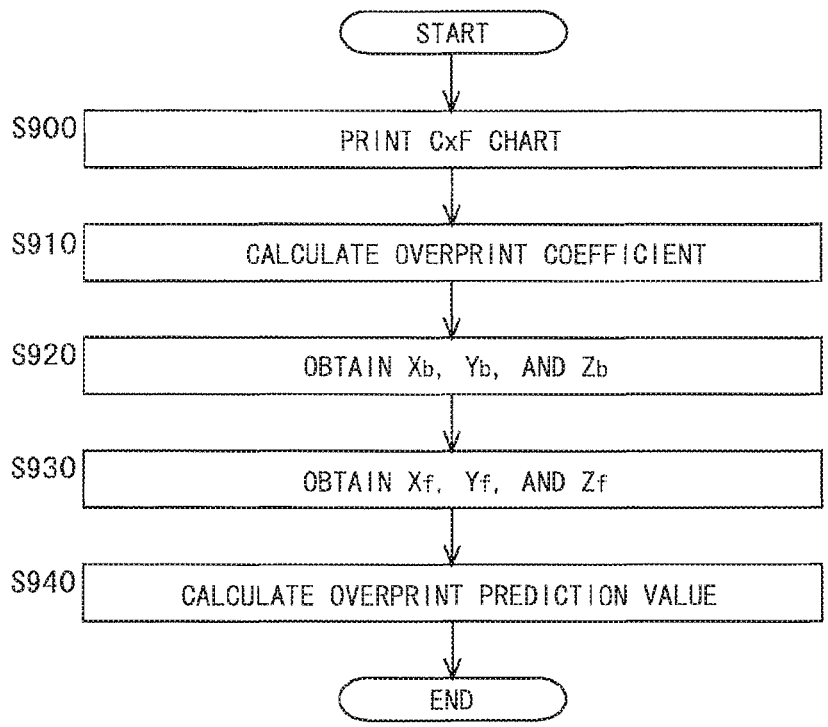
FIG. 21 is a flowchart for describing the Deshpande et al. method in relation to the conventional example.

The pre-processing that needs to be performed in the printing system prior to the color prediction process will be described. FIG. 4 is a block diagram for describing a flow of the pre-processing. In the color prediction process, reflectance data of a printed portion on the base material and reflectance data of a printed portion on black (black solid) are required for each spot color that may be included in the submitted data. The reflectance data described above can be obtained by performing colorimetry of a C×F chart (C×F chart printed on the base material) as shown in FIG. 20 for each spot color, as in the prior art.

Therefore, in the pre-processing, print data Dch for outputting the C×F chart is firstly created by the print data generation apparatus 100, and the print data Dch is sent to the plate making apparatus 200. The plate making apparatus 200 produces a printing plate PL on the basis of the print data Dch. Then, the printing apparatus 300 performs printing using the printing plate PL. Thus, the C×F chart CH is outputted from the printing apparatus 300. Thereafter, the colorimetry of the C×F chart CH is performed by the colorimeter 500. Colorimetric data Dcm, which is reflectance data obtained by the colorimetry by the colorimeter 500, is sent to the print data generation apparatus 100. The process as described above is performed for each ink color (preferably, for each spot color) that may be included in the submitted data.

As described above, the colorimeter 500 used in the present embodiment is a spectral colorimeter. Therefore, the reflectance data obtained by the colorimetry is spectral reflectance data. The spectral reflectance data is obtained for each of wavelength ranges at intervals of, for example, 10 nm within a wavelength range of 380 to 730 nm. In this case, thirty-six items of spectral reflectance data can be obtained as the colorimetric data Dcm by the colorimetry of any one of patches in the C×F chart CH.

<4. Color Prediction Process>

Next, a color prediction process for predicting a color obtained by sequentially overprinting inks of a plurality of colors on a unit region (typically, one pixel) of a base material will be described.

<4.1 Overview>

Figure 5:
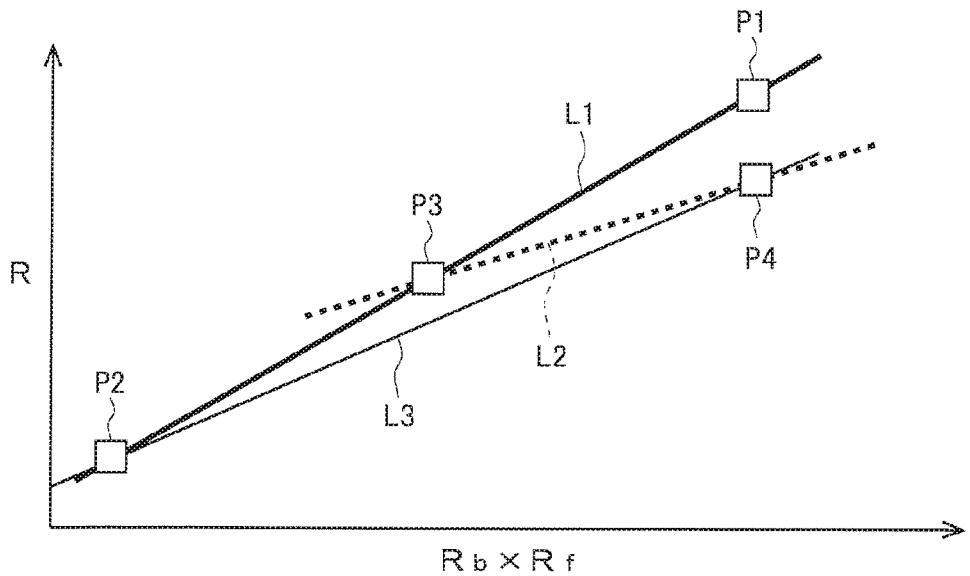
FIG. 5 is a diagram for describing a color prediction coordinate system and calibration points in the embodiment.
Figure 22:
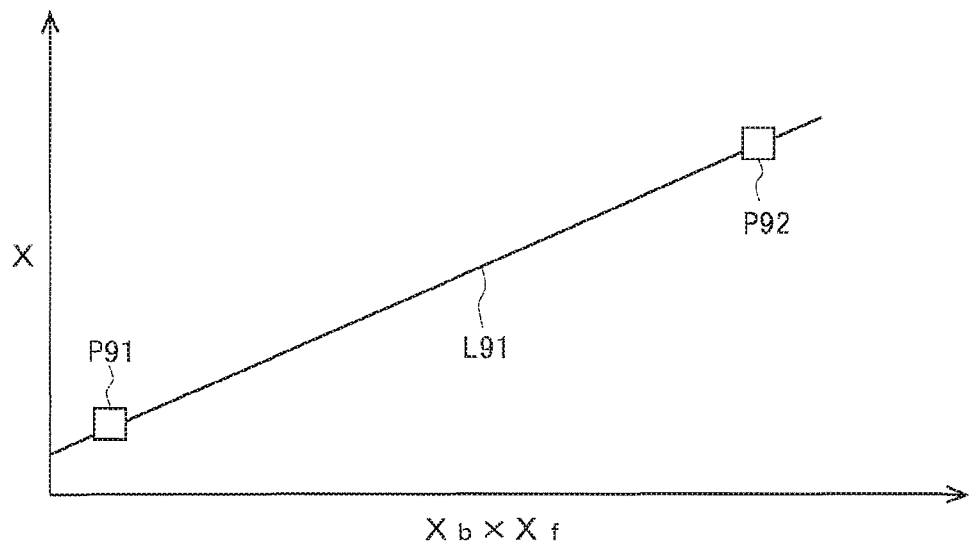
FIG. 22 is a diagram for describing the Deshpande et al. method in relation to the conventional example.

In the present embodiment, the reflectance of a portion where inks overlap and the reflectance of the portion where the inks do not overlap are calculated separately. In this regard, in order to obtain the reflectance of the portion where the inks overlap as accurately as possible, in a color prediction coordinate system, as shown in FIG. 5, in which the abscissa indicates the product of a reflectance $R_b$ of the background and a reflectance $R_f$ of the foreground and the ordinate indicates a reflectance R of a state where the background and the foreground overlap, the coordinates (in FIG. 5, the coordinates denoted by P1) representing the reflectance of a state where an ink of a spot color or the like is applied on a transparent ink are used as one of calibration points. The prediction accuracy is improved by proportionally distributing the calculation result of the portion where the inks overlap and the calculation result of the portion where the inks do not overlap depending on a printing rate. Note that the coordinates indicated by P2 in FIG. 5 correspond to the coordinates indicated by P91 in FIG. 22 (prior art), the coordinates indicated by P4 in FIG. 5 correspond to the coordinates indicated by P92 in FIG. 22, and the straight line indicated by L3 in FIG. 5 corresponds to the straight line indicated by L91 in FIG. 22.

Meanwhile, even when the reflectance of the background ink is almost equal to the reflectance of the base material, an ink may be already applied on the base material. Also, the reflectance of ink varies depending on the wavelength. For example, a yellow ink has an extremely low reflectance at a wavelength of 450 nm and an extremely high reflectance at a wavelength of 600 nm. In the present embodiment, in order to take these facts into consideration, the coordinates representing a reflectance of a state in which a spot color ink and the like is applied on the transparent ink are used as a calibration point (hereinafter referred to as a "first calibration point") as described above, and the reflectance is obtained for each wavelength range of a predetermined width. In addition, the coordinates representing a reflectance of a state where the target ink is applied on black (black solid) are defined as a second calibration point P2, and coefficients of an equation representing a line (straight line in the present embodiment) L1 connecting the first calibration point P1 and the second calibration point P2 are obtained (see FIG. 5). The equation representing the line L1 is for obtaining the reflectance of a state in which other ink is applied on a certain ink in consideration of the adhesion state of the other ink. In other words, the equation representing the line L1 is an equation for obtaining the actual reflectance (reflectance in consideration of trapping) corresponding to the reflectance of the background when the reflectance of the ink in the foreground is fixed.

It should be noted that, in order to consider trapping, a film thickness ratio (a ratio of a film thickness of an ink after trapping to a film thickness of the ink before trapping) is set. The film thickness ratio is typically set to a value within a range of 0.6 to 0.8. In a case where an ink is applied on the base material, the film thickness ratio of the ink is 1. Therefore, the reflectance at the set film thickness ratio can be obtained from the reflectance in that case using an exponential function or the like. When the reflectance is obtained, an optical dot gain is also taken into account.

Further, regarding the background, the reflectance (average reflectance) of a printing region is calculated based on the printing rate and the reflectance of the entire background. The reflectance corresponding to the product of the reflectance of the printing region and the reflectance of the foreground is obtained by the equation representing the line L1. Then, the coordinates representing the obtained reflectance are defined as a third calibration point P3. The third calibration point P3 corresponds to a point representing a prediction value of the reflectance of a state in which the foreground ink is solidly applied on the background having the calculated average reflectance.

In the present embodiment, the coordinates representing the reflectance of a state in which the foreground ink is applied on the base material are defined as a fourth calibration point P4. Then, coefficients of an equation representing a line (in the present embodiment, a straight line) L2 connecting the third calibration point P3 and the fourth calibration point P4 are obtained. The third calibration point P3 is associated with the reflectance of the printing region, and the fourth calibration point P4 is associated with the reflectance of the base material (that is, the reflectance of a non-printing region). Therefore, the equation representing the line L2 connecting the third calibration point P3 and the fourth calibration point P4 is an equation for obtaining the actual reflectance corresponding to the reflectance of the entire background when the reflectance of the foreground ink is fixed. An overprint prediction value is calculated using the equation representing the line L2.

<4.2 Specific Procedure>

Hereinafter, specific procedures of the color prediction process will be described. In the following, an equation representing the abovementioned line L1 is referred to as a "first conversion equation", and an equation representing the abovementioned line L2 is referred to as a "second conversion equation". Further, a general equation of a straight line connecting two arbitrary points in the color prediction coordinate system as shown in FIG. 5 is expressed by the following Equation (4).

$$R = j \times (R_b \times R_f) + k \tag{4}$$

In the above Equation (4), R represents the reflectance of a state in which the background and the foreground overlap, $R_b$ represents the reflectance of the background, and $R_f$ represents the reflectance of the foreground, j and k are coefficients.

Further, j and k in the above Equation (4) for the first conversion equation are represented by j1 and k1, respectively, and j and k in the above Equation (4) for the second conversion equation are represented by j2 and k2, respectively.

In the present description, it is assumed that a color obtained by overprinting a plurality of inks on the base material in a unit region in the order of "ink of first printing color, ink of second printing color, ink of third printing color, . . . , ink of Nth printing color" is a prediction target.

Figure 6:
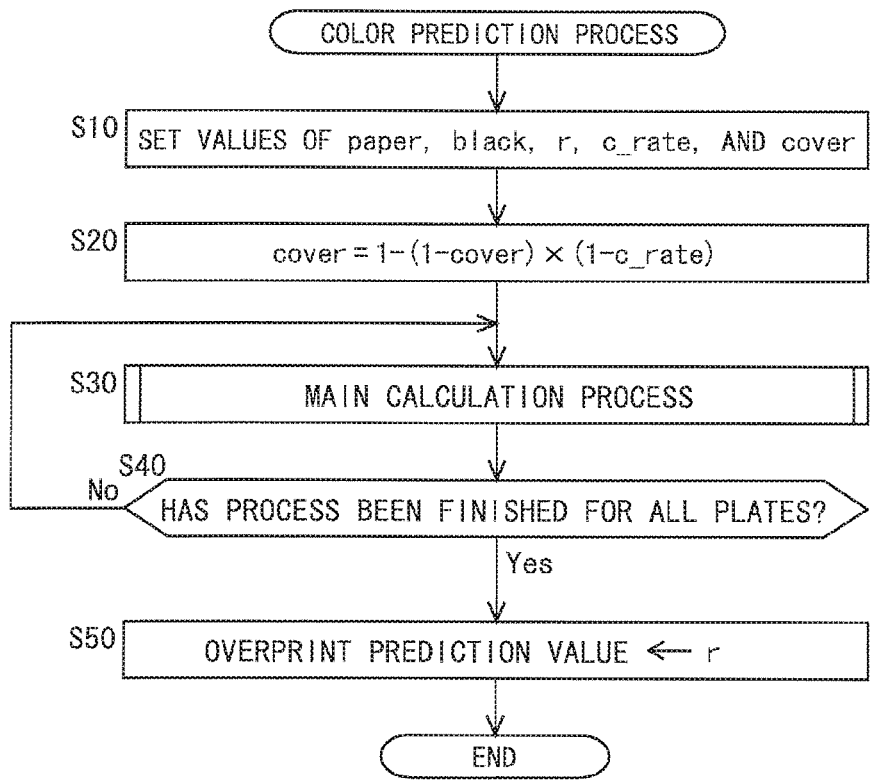
FIG. 6 is a flowchart showing a procedure of a color prediction process in the embodiment.
Figure 7:
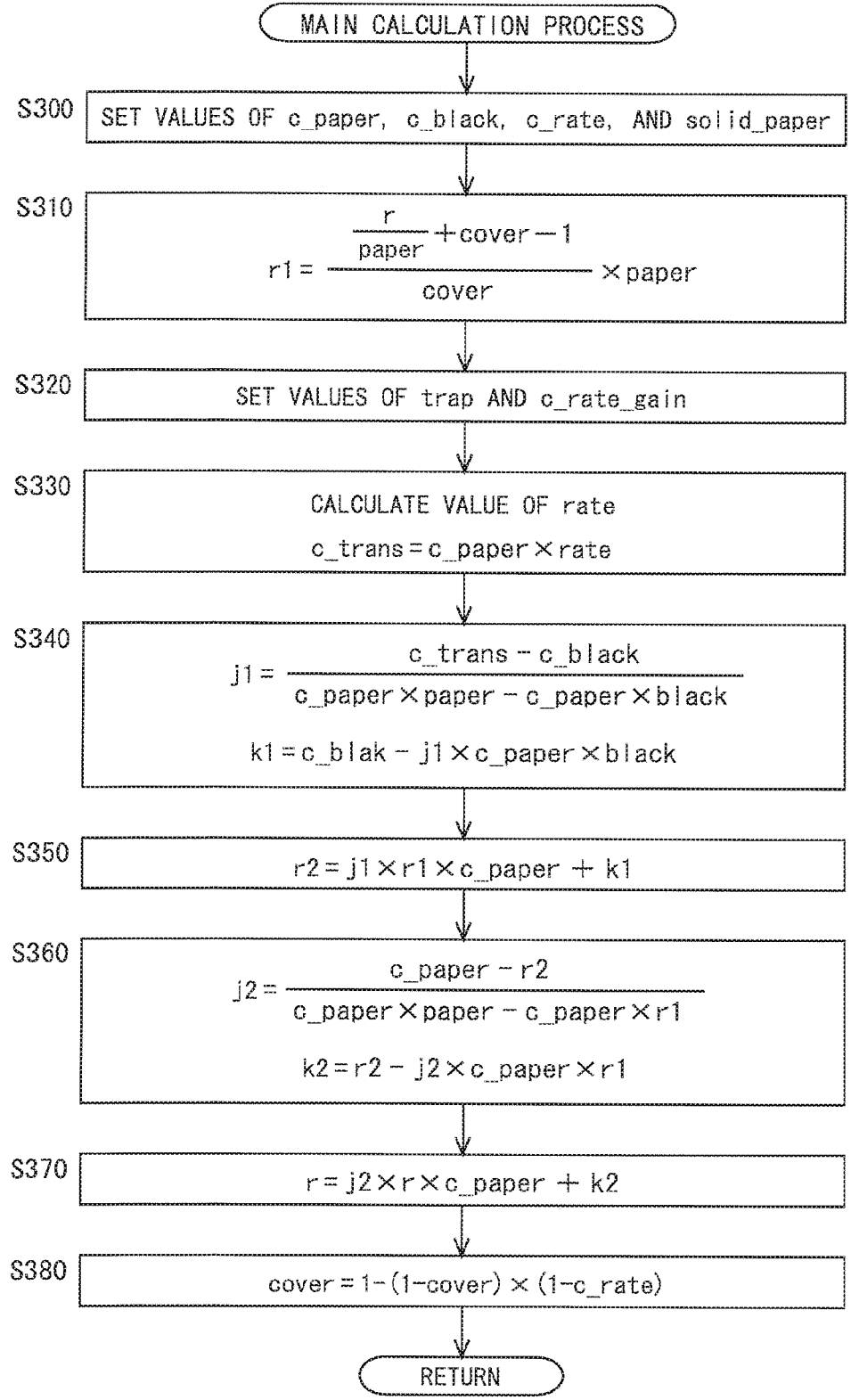
FIG. 7 is a flowchart showing a procedure of a main calculation process in the color prediction process in the embodiment.

In the present embodiment, the process of the flow shown in FIGS. 6 and 7 is performed for each wavelength range. Similar to the obtaining of spectral reflectance data in the pre-processing, the process of the flow shown in FIGS. 6 and 7 is performed for each of wavelength ranges at intervals of 10 nm within a wavelength range of 380 nm to 730 nm, for example.

After the color prediction process is started, values of a variable paper, a variable black, a variable r, a variable c_rate, and a variable cover are firstly set (step S10) (see FIG. 6). Specifically, the value of the variable paper is set to the reflectance of the base material, the value of the variable black is set to the reflectance of black (black solid), the value of the variable r is set to the reflectance of a state in which the ink of the first printing color is applied on the base material, the value of the variable c_rate is set to the dot percentage of the ink of the first printing color, and the value of the variable cover is set to 0. The variable cover is a variable for holding a printing rate representing a proportion of the printing region to the unit region. The values of the variable paper, the variable black, and the variable r are obtained by colorimetry of the C×F chart in the pre-processing. In this regard, referring to FIG. 20, the value of the variable paper is obtained by the colorimetry of the patch PA94 in the C×F chart, and the value of the variable black is obtained by the colorimetry of the patch PA93 in the C×F chart (a C×F chart which is printed using an ink of any color can be used). The value of the variable r is obtained by the colorimetry of a corresponding patch in the C×F chart printed using the ink of the first printing color. The variable c_rate is set to, for example, a value obtained by dividing the value of pixel data by 255, if the pixel data is 8-bit data, for example.

Next, as shown in the following Equation (5), the value of the variable cover (printing rate) is updated (step S20).

$$\text{cover}=1-(1-\text{cover})\times(1-c\_\text{rate}) \quad (5)$$

In the above Equation (5), the cover on the left side indicates a printing rate after the update, and the cover on the right side indicates a printing rate before the update. The initial value of the variable cover is set to 0, and thus, if the value of the variable c_rate is 0.3, the value of the variable cover after update is 0.3. Also, if the value of the variable cover before update is 0.4 and the value of the variable c_rate is 0.5, for example, the value of the variable cover after update is 0.7.

Next, a main calculation process, which is a main process of the color prediction process, is performed (step S30). The main calculation process is performed for each plate (that is, for each ink color). Therefore, every time one main calculation process is finished, it is determined whether or not the process for all plates is finished (step S40). If there is an unprocessed plate as a result of the determination, the flow returns to step S30. On the other hand, if the process for all plates has been finished, the flow proceeds to step S50. In step S50, the current value of the variable r (the value assigned to the variable r in the most recently performed main calculation process) is outputted as an overprint prediction value. In a case in which the color prediction process is performed for each of wavelength ranges at intervals of 10 nm within a wavelength range of 380 nm to 730 nm as described above, one color is identified by thirty-six overprint prediction values.

In the present embodiment, a first reflectance obtaining step and first reflectance obtaining means are achieved by step S10, a printing rate calculation step is achieved by step S20, and a calculation step and calculation means are achieved by step S30.

FIG. 7 is a flowchart showing the procedure of the main calculation process. If the number of printing colors used for printing the unit region to be processed is defined as N (N is an integer of 2 or more), this main calculation process is executed N−1 times. For example, when the ink of the first printing color, the ink of the second printing color, and the ink of the third printing color are used to print the unit region to be processed (when the number of printing colors to be used is three, that is, "N=3"), the main calculation process is performed twice. Hereinafter, the Kth main calculation process (K is an integer of 1 or more and N−1 or less) will be described in detail.

After the main calculation process is started, values of the variable c_paper, the variable c_black, the variable c_rate, and the variable solid_paper are firstly set (step S300). Specifically, the value of the variable c_paper is set to the reflectance of a state where the ink of (K+1)th printing color is applied on the base material, the value of the variable c_black is set to the reflectance of a state where the ink of the (K+1)th printing color is applied on black (black solid), the value of the variable c_rate is set to the dot percentage of the ink of the (K+1)th printing color, and the value of the variable solid_paper is set to the reflectance of a state where the ink of the (K+1)th printing color is applied on the base material at a dot percentage of 100%. For example, the value of the variable c_paper is set to the reflectance of a state in which the ink of the second printing color is applied on the base material during the first main calculation process, and is set to the reflectance of a state in which the ink of the fifth printing color is applied on the base material during the fourth main calculation process. The values of the variables c_paper, c_black, and solid_paper are obtained by performing colorimetry of the corresponding patches in the C×F chart which is printed using the ink of the (K+1)th printing color in the pre-processing.

Next, the value of a variable r1 representing the reflectance of the printing region (reflectance of the printing region before the ink of the (K+1)th printing color is applied on the ink of the Kth printing color), as shown in the following Equation (6) (step S310).

$$r1 = \frac{\frac{r}{\text{paper}} + \text{cover} - 1}{\text{cover}} \times \text{paper} \quad (6)$$

In this regard, since the printing rate represents the proportion of the area of the printing region 72 to the area of the entire unit region 71 (see FIG. 8), the reflectance r for the entire unit region 71 is expressed by the following Equation (7).

$$r = \text{cover} \times r1 + (1-\text{cover}) \times \text{paper} \quad (7)$$

Figure 8:
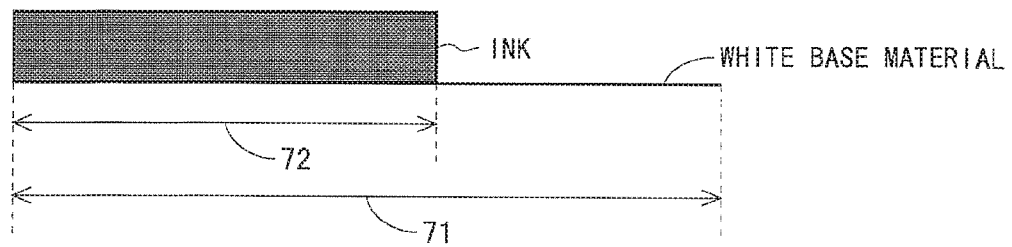
FIG. 8 is a diagram for describing a printing rate in the embodiment.

The above Equation (6) is obtained by solving r1 in the above Equation (7). Note that FIG. 8 illustrates that the ink is unevenly applied on the base material for convenience of describing the printing rate.

When the value of the variable K is 1, the value of the variable r1 is set to the reflectance of the printing region with a state where the ink of the first printing color is applied on the base material. When the value of the variable K is 2 or more, the value of the variable r1 is set to the reflectance of the printing region with a state where the ink of the Kth printing color is overprinted on the ink of the (K−1)th printing color.

Next, values of the variable trap and the variable c_rate_gain are set (step S320). Specifically, for the ink of the (K+1)th printing color, the value of the variable trap is set to a value of the film thickness ratio representing the ratio of the film thickness of ink after trapping to the film thickness of ink before trapping. More specifically, the value of the variable trap is typically set to a value within a range of 0.6 to 0.8. The value of the variable c_rate_gain is set to a virtual dot percentage in consideration of an optical dot gain for the ink of the (K+1)th printing color.

Next, the value of the variable rate representing the rate of increase in reflectance due to the calculations that take into account trapping and optical dot gain (the rate of decrease in reflectance if the optical dot gain more greatly affects the reflectance than trapping) is calculated, and the value of the variable c_trans is calculated on the basis the value of the variable rate (step S330).

In step S340, first, the value of the variable rate is calculated as shown in the following Equation (8).

$$\text{rate} = \frac{\text{pow}\left(\frac{\text{solid\_paper}}{\text{paper}} \cdot \text{trap}\right) \times \text{c\_rate\_gain} + (1 - \text{c\_rate\_gain})}{\frac{\text{solid\_paper}}{\text{paper}} \times \text{c\_rate} + (1 - \text{c\_rate})} \quad (8)$$

In the above Equation (8), when the first argument and the second argument of pow are represented by a and b, respectively, pow(a, b) is a function that returns the bth power of a. The value of the variable c_rate represents a dot percentage not considering the optical dot gain, and the value of the variable c_rate_gain represents a dot percentage taking into account the optical dot gain. Therefore, the denominator on the right side of Equation (8) represents the reflectance (prediction value) of the entire unit region in the case the trapping and the optical dot gain are not taken into consideration, and the numerator on the right side of the above Equation (8) represents the reflectance (prediction value) of the entire unit region in the case a decrease in the film thickness due to the trapping (or an increase in the film thickness due to inversed trapping) and a variation in size (generally, an increase in size) of a halftone dot due to an influence of the optical dot gain are considered. That is, as described above, the value of the variable rate represents the rate of increase in reflectance due to calculations that take into account trapping and optical dot gain.

After the calculation of the value of the variable rate, the value of the variable c_trans is calculated as shown in the following Equation (9). The value of the variable c_trans represents, on the assumption that a transparent ink is applied on the base material, the reflectance of the unit region with a state in which the ink of the (K+1)th printing color is overprinted on the transparent ink. In the case of overprint of inks of two colors, this reflectance is a value obtained by calculating the reflectance of the unit region with a state where the ink of the second printing color is supposed to be overprinted not on the base material but on another ink, with the value of the variable c_paper being modified (corrected) in consideration of at least one of the trapping and the dot gain of the ink of the second printing color.

$$c\_trans = c\_paper \times rate \quad (9)$$

The above Equation (9) can be modified as shown in the following Equation (10).

$$c\_trans = c\_paper \times \frac{\left(\frac{solid\_paper}{paper}\right)^{trap} \times c\_rate\_gain + (1 - c\_rate\_gain)}{\frac{solid\_paper}{paper} \times c\_rate + (1 - c\_rate)} \quad (10)$$

In the present embodiment, in the color prediction coordinate system as shown in FIG. 5, the coordinates representing the reflectance of a state in which a spot color ink or the like (here, the ink of the (K+1)th printing color) is applied on the transparent ink are defined as the first calibration point P1, as described above. In addition, the coordinates representing the reflectance of a state where the spot color ink or the like (here, the ink of the (K+1)th printing color) is further applied on the portion where a black ink is solidly applied on the base material are defined as the second calibration point P2. Then, in step S340, the coefficients j1 and k1 included in the first conversion equation representing the line L1 connecting the first calibration point P1 and the second calibration point P2 are obtained.

Figure 9:
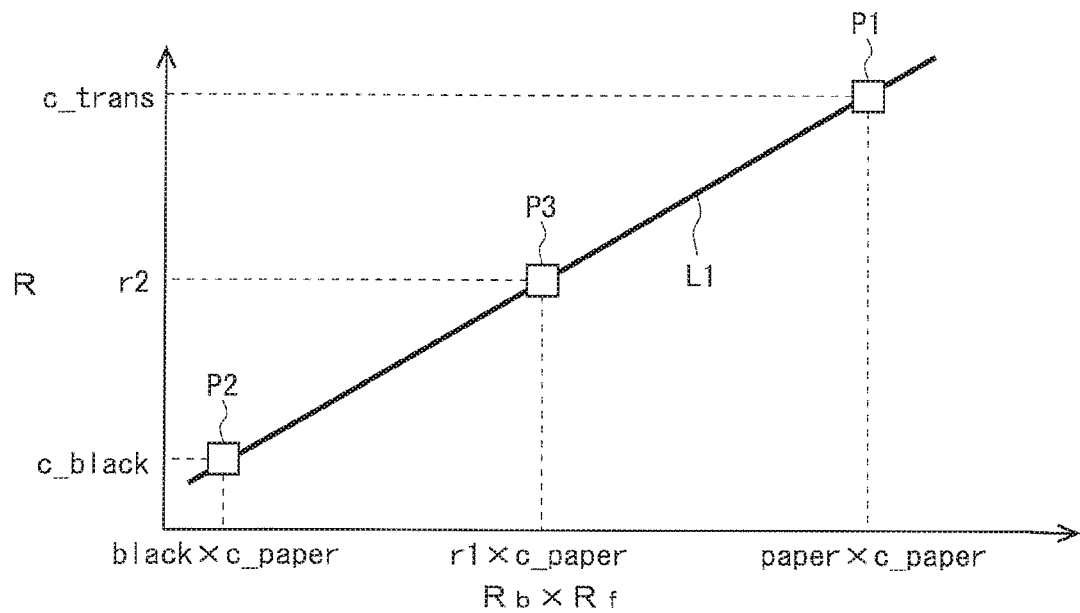
FIG. 9 is a diagram for describing a calculation process using a first calibration point and a second calibration point in the embodiment.

The following Equation (11) is established at the first calibration point P1, and the following Equation (12) is established at the second calibration point P2 (see FIG. 9).

$$c\_trans = j1 \times (paper \times c\_paper) + k1 \quad (11)$$

$$c\_black = j1 \times (black \times c\_paper) + k1 \quad (12)$$

In step S340, a simultaneous equation consisting of Equation (11) for the first calibration point P1 and Equation (12) for the second calibration point P2 is solved, whereby the values of the coefficients j1 and k1 (that is, the value of the coefficient j1 of the first-order term in the linear equation and the value of the constant term k1 in the linear equation) are calculated.

Figure 10:
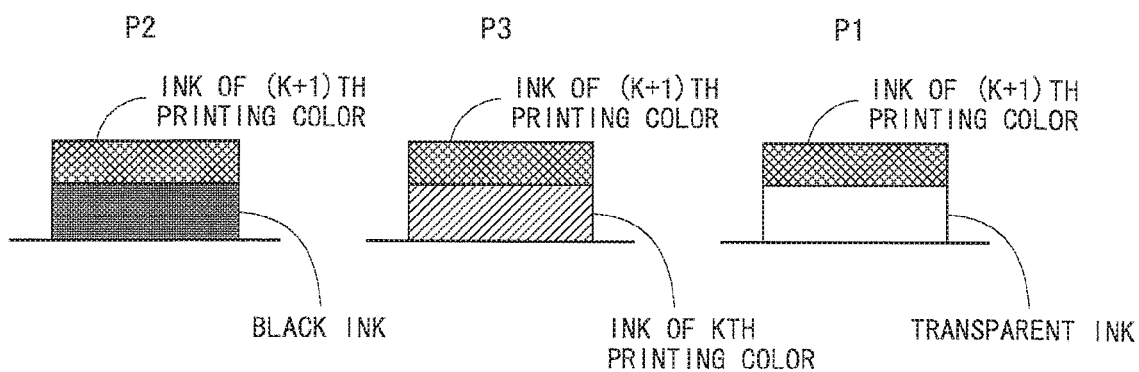
FIG. 10 is a diagram for describing a calculation process using a first conversion equation in the embodiment.

After the first conversion equation is specified as described above, the value of the variable r1 is assigned to $R_b$ of the first conversion equation, and the value of the variable c_paper is assigned to $R_f$ of the first conversion equation. Thus, the value of the variable r2 is calculated (step S350) (see the above Equation (4)). In this regard, the first calibration point P1 corresponds to the coordinates representing the reflectance of a state where the ink of the (K+1)th printing color is applied on the transparent ink (that is, the reflectance in consideration of trapping etc.), and the second calibration point P2 corresponds to the coordinates representing the reflectance of the state in which the ink of the (K+1)th printing color is applied on the black ink (see FIG. 10). Here, the value of the reflectance before the ink of the (K+1)th printing color is applied is the value of the variable r1 calculated in step S310. Therefore, by assigning the value of the variable r1 to $R_b$ of the first conversion equation, the reflectance of the state in which the ink of the (K+1)th printing color is overprinted on the ink of the Kth printing color is obtained. Then, the coordinates representing the obtained reflectance are defined as the third calibration point P3.

The value of the variable r1 represents the reflectance of the printing region (the reflectance of the printing region before the ink of the (K+1)th printing color is applied on the ink of the Kth printing color). Therefore, the third calibration point P3 corresponds to coordinates representing the reflectance in the case the printing rate of the background in the unit region is assumed to be 100%. However, the actual value of the printing rate of the background in the unit region is the value of the variable cover. In view of this, coordinates representing the reflectance of a state where the ink of the (K+1)th printing color is applied on the base material are defined as a fourth calibration point P4. The fourth calibration point P4 corresponds to the coordinates representing the reflectance in the case the printing rate of the background in the unit region is assumed to be 0%.

Figure 11:
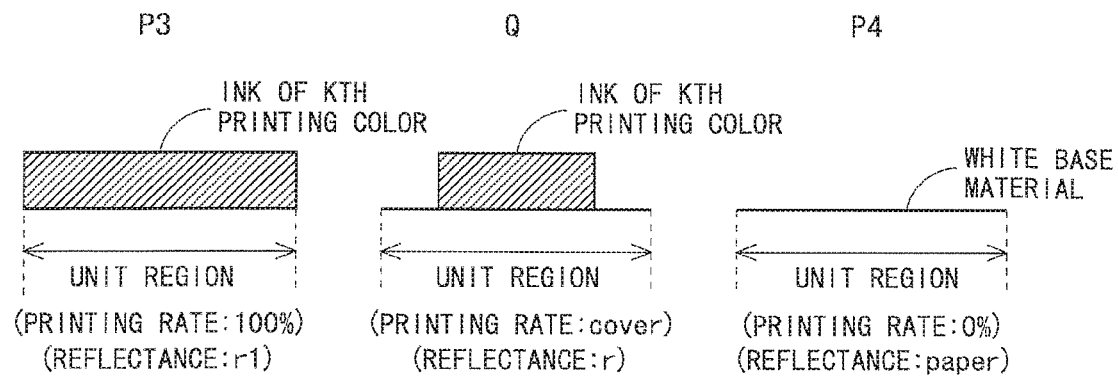
FIG. 11 is a diagram for describing a calculation process using a second conversion equation in the embodiment.

In step 360, the coefficients j2 and k2 included in the second conversion equation representing a line L2 connecting the third calibration point P3 and the fourth calibration point P4 are obtained, in order to calculate the reflectance in the case the value of the printing rate of the background in the unit region is the value of the variable cover, on the basis of the reflectance in the case the printing rate of the background in the unit region is assumed to be 100% and the reflectance in the case the printing rate of the background in the unit region is assumed to be 0% (see FIG. 11).

Figure 12:
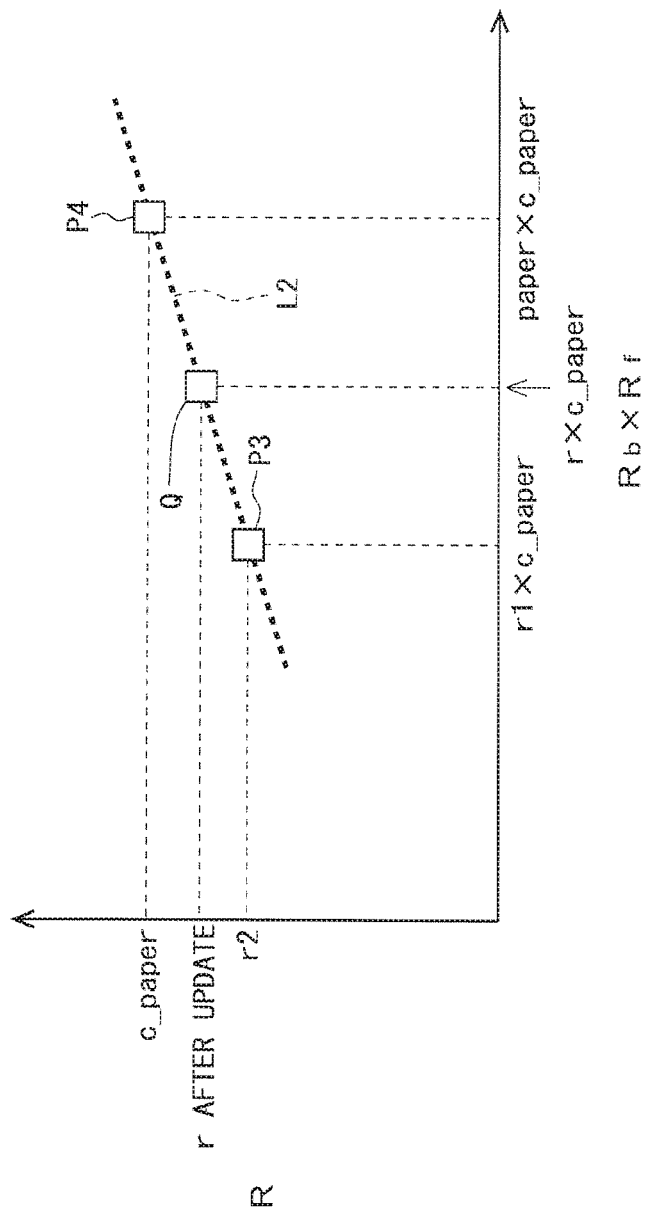
FIG. 12 is a diagram for describing a calculation process using a third calibration point and a fourth calibration point in the embodiment.

The following Equation (13) is established at the third calibration point P3, and the following Equation (14) is established at the fourth calibration point P4 (see FIG. 12).

$$r2 = j2 \times (r1 \times c\_paper) + k2 \quad (13)$$

$$c\_paper = j2 \times (paper \times c\_paper) + k2 \quad (14)$$

In step S360, a simultaneous equation consisting of Equation (13) for the third calibration point P3 and Equation (14) for the fourth calibration point P4 is solved, whereby the values of the coefficients j2 and k2 (that is, the value of the coefficient j2 of the first-order term in the linear equation and the value of the constant term k2 in the linear equation) are calculated.

After the second conversion equation is specified as described above, the value of the variable r is assigned to $R_b$ of the second conversion equation, and the value of the variable c_paper is assigned to $R_t$ of the second conversion equation. Thus, the value of the variable r is updated (step S370). In this regard, as shown in FIG. 11, the reflectance of the background for the third calibration point P3 is r1 (that is, the reflectance of the printing region), and the reflectance of the background for the fourth calibration point P4 is paper (that is, the reflectance of the base material). The value of the reflectance of the entire unit region before the ink of the (K+1)th printing color is applied is the value of the variable r immediately before the process of step S370 is performed. Therefore, by assigning the value of the variable r to $R_b$ of the second conversion equation, the reflectance of the entire unit region with the state in which the ink of the (K+1)th printing color is overprinted on the ink of the Kth printing color can be obtained (see the portion marked with Q in FIG. 12).

Next, as shown in the above Equation (5), the value of the variable cover (printing rate) is updated (step S380). When the process of step S380 ends, the main calculation process ends, and the flow proceeds to step S40 in FIG. 6.

By repeating the main calculation process as described above N−1 times (N is the number of printing colors used to print the unit region to be processed), the reflectance of a state where the inks of the first printing color to the Nth printing color are sequentially overprinted on the base material is obtained.

Note that the value of the variable r corresponds to the first reflectance, the value of the variable r1 corresponds to the second reflectance, the value of the variable c_trans corresponds to the third reflectance, the value of the variable c_paper corresponds to the fourth reflectance, the value of the variable paper corresponds to the fifth reflectance, the value of the variable black corresponds to the sixth reflectance, the value of the variable c_black corresponds to the seventh reflectance, and the value of the variable r2 corresponds to the eighth reflectance. Further, the coordinates of the first calibration point P1 correspond to the first coordinates, the coordinates of the second calibration point P2 correspond to the second coordinates, the coordinates of the third calibration point P3 correspond to the third coordinates, and the coordinates of the fourth calibration point P4 correspond to the fourth coordinates.

In the present embodiment, the second reflectance calculation step and second reflectance calculation means are achieved by step S310, the third reflectance calculation step and third reflectance calculation means are achieved by steps S320 and S330, the first conversion equation calculation step and first conversion equation calculation means are achieved by step S340, the eighth reflectance calculation step and eighth reflectance calculation means are achieved by step S350, the second conversion equation calculation step and second conversion equation calculation means are achieved by step S360, the first reflectance update step and first reflectance update means are achieved by step S370, and a printing rate update step is achieved by step S380.

When a color obtained by sequentially overprinting the ink of the first printing color and the ink of the second printing color on the base material is a prediction target, the main calculation process described above is performed only once. In this case, the prediction value calculation step is achieved by step S370.

<5. Flow of Process for One PDF File>

Figure 13:
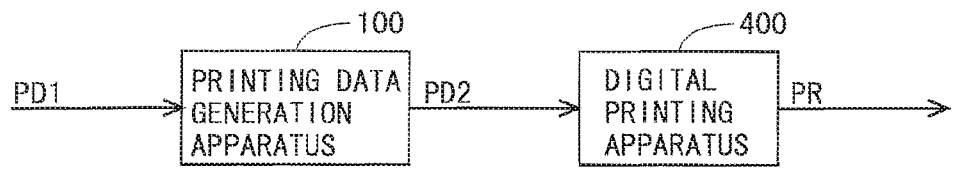
FIG. 13 is a block diagram for describing the flow of a process for one PDF file in the embodiment.
Figure 14:
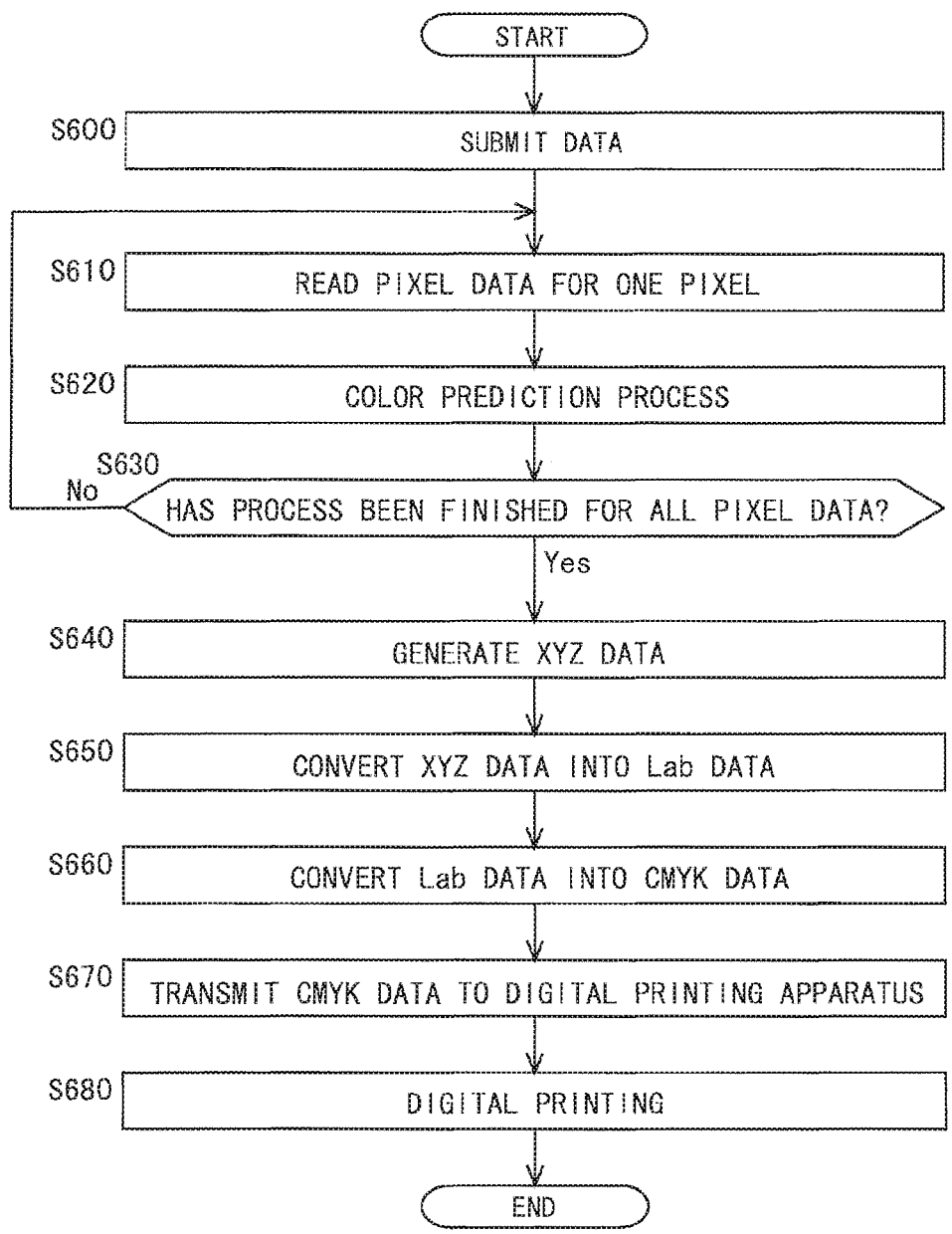
FIG. 14 is a flowchart showing a procedure of the process for one PDF file in the embodiment.

Next, a flow of process from when one PDF file is given to the print data generation apparatus 100 until printing is performed by the digital printing apparatus 400 will be described with reference to the block diagram shown in FIG. 13 and the flowchart shown in FIG. 14.

First, a PDF file PD1 is inputted into the print data generation apparatus 100 as submitted data (step S600). Thereafter, the print data generation apparatus 100 reads pixel data for one pixel (step S610). Then, the color prediction process for predicting the color of the pixel data read in step S610 is performed by the print data generation apparatus 100 (step S620). Note that it is not necessary to predict colors for all pixel data by the abovementioned method, and it is sufficient to predict colors for some pixel data (for example, pixel data using a plurality of colors including a spot color) by the abovementioned process.

After the end of the color prediction process, it is determined whether the color prediction process has been finished for all pixel data (step S630). If the color prediction process has been finished for all pixel data as a result of the determination, the flow proceeds to step S640, and if not, the flow returns to step S610. In this way, steps S610 and S620 are repeated until the colors of all pixel data are predicted.

In step S640, the print data generation apparatus 100 generates XYZ data (data of the CIEXYZ color space) which is data of tristimulus values X, Y, and Z on the basis of the result of the color prediction process in step S620. In this regard, in the present embodiment, spectral reflectance data for each of wavelength ranges at intervals of, for example, 10 nm is obtained by the color prediction process. The tristimulus values X, Y, and Z are obtained by known methods from spectral distribution of a light source, spectral reflectance, and color matching functions associated with the tristimulus values X, Y, and Z, respectively.

After generating the XYZ data, the print data generation apparatus 100 performs a process of converting the XYZ data into Lab data (data of the CIELAB color space) (step S650). Since both the CIEXYZ color space and the CIELAB color space are profile connection spaces (PCS) which are device-independent color spaces, conversion from the XYZ data to the Lab data is easily performed by a known method.

Next, the print data generation apparatus 100 converts the Lab data into CMYK data using an ICC profile for output to the digital printing apparatus 400 (step S660). Thereafter, the CMYK data generated in step S660 is transmitted from the print data generation apparatus 100 to the digital printing apparatus 400 as print data PD2 (step S670). Then, the digital printing apparatus 400 executes printing (digital printing) on the basis of the print data PD2 which is CMYK data (step S680). Thus, a printed matter PR is outputted from the digital printing apparatus 400. In this way, a series of processes ends.

In step S660 described above, the Lab data is converted into the CMYK data. However, for example, the Lab data may be converted into RGB data using an ICC profile for output to the display unit 16. Thus, it becomes possible to confirm the result obtained by the color prediction process on the screen of the display unit 16. Further, for example, the configuration may be such that, only when the result confirmed on the screen of the display unit 16 is satisfactory, the Lab data is converted into CMYK data and printing is performed by the digital printing apparatus 400.

In the present embodiment, a color prediction step and color prediction means are achieved by steps S610 to S630, an XYZ data generation step and XYZ data generation means are achieved by step S640, a first data conversion step and first data conversion means are achieved by step S650, and a second data conversion step and second data conversion means are achieved by step S660.

<6. Effect>

According to the present embodiment, in the main calculation process, the reflectance c_trans of the unit region with a state where, on the assumption that a transparent ink is applied on the base material, the ink of the (K+1)th printing color is overprinted on the transparent ink is obtained, and the reflectance (reflectance of the portion where the inks are superimposed) r2 of a state where the ink of the (K+1)th printing color is overprinted on the ink of the Kth printing color is obtained in consideration of the reflectance c_trans. Then, in consideration of the reflectance (reflectance of the portion where the inks do not overlap) c_paper of a state where the ink of the (K+1)th printing color is applied on the base material and the printing rate, the reflectance r of the unit region with a state in which the inks of the first printing color to the (K+1)th printing color are sequentially overprinted on the base material is obtained. In this way, the reflectance is obtained in consideration of ink trapping. In addition, when the reflectance c_trans is calculated, the optical dot gain of inks is taken into consideration. As described above, color prediction is performed in consideration of ink trapping and optical dot gain of inks. Therefore, according to the present embodiment, it is possible to predict a color obtained by overprinting inks of a plurality of colors more accurately than ever. As a result, it is possible to obtain, by the digital printing apparatus, a printed matter with little difference from a printed matter outputted from the conventional printing apparatus.

<7. Modifications, Etc.>

<7.1 Modification Regarding Data Used for Color Prediction Process (First Modification)>

In the above embodiment, various calculations using reflectance data are performed in the color prediction process. However, the present invention is not limited thereto. For example, when only data of tristimulus values X, Y, and Z can be obtained by the colorimetry by the colorimeter 500, the data of tristimulus values may be used for various calculations in the color prediction process, although the prediction accuracy is lowered. The color prediction process in the present modification can be performed in the same procedure as the color prediction process in the above embodiment. The specific procedure of the color prediction process in this modification will be briefly described below. Here, any one of the color tristimulus values X, Y, and Z is simply referred to as "stimulus value". Further, a general equation representing a straight line connecting two points in the color prediction coordinate system is represented herein by the following Equation (15).

$$S = j \times (S_b \times S_r) + k \quad (15)$$

In the above Equation (15), S represents a stimulus value of a state where the background and the foreground overlap, $S_b$ represents the stimulus value of the background, and $S_r$ represents the stimulus value of the foreground. j and k are coefficients.

Figure 15:
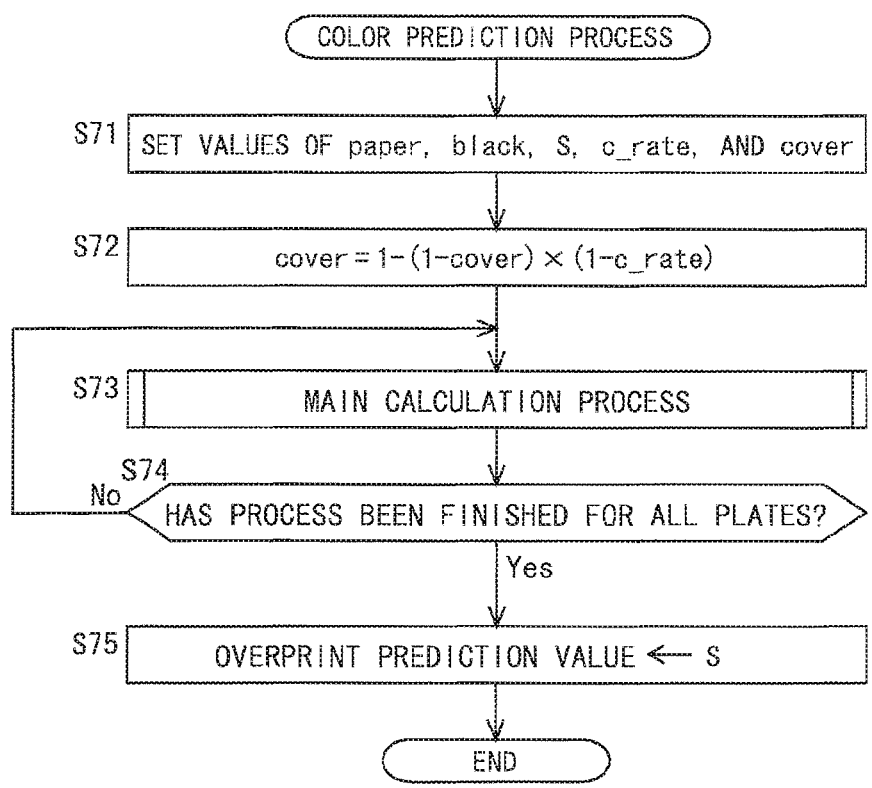
FIG. 15 is a flowchart showing a procedure of a color prediction process according to a first modification of the embodiment.
Figure 16:
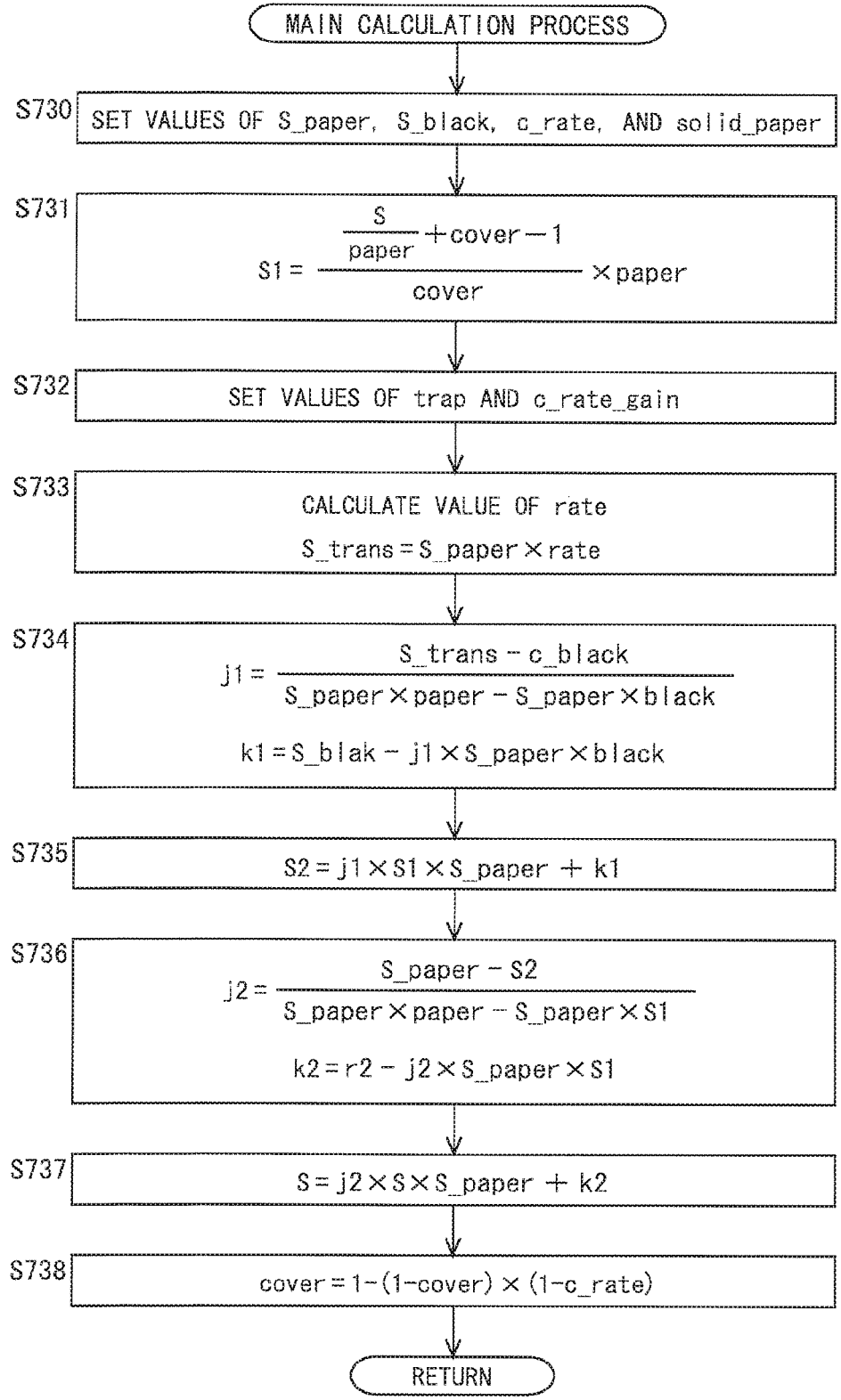
FIG. 16 is a flowchart showing a procedure of a main calculation process in the color prediction process according to the first modification of the embodiment.

In the present modification, process of flows shown in FIGS. 15 and 16 are performed for each stimulus value.

After the color prediction process is started, values of a variable paper, a variable black, a variable S, a variable c_rate, and a variable cover are firstly set (step S71) (see FIG. 15). The value of the variable paper is set to the stimulus value of the base material, the value of the variable black is set to the stimulus value of black (black solid), and the value of the variable S is set to the stimulus value of a state where the ink of the first printing color is applied on the base material. The other variables are the same as those in the above embodiment. Next, as shown in the above Equation (5), the value of the variable cover (printing rate) is updated (step S72). Next, a main calculation process is performed (step S73). The main calculation process is performed for each plate (that is, for each ink color), and it is determined whether or not the process has been performed for all plates, each time one main calculation process is completed (step S74). If there is an unprocessed plate as a result of the determination, the flow returns to step S73. On the other hand, if the process has been finished for all plates, the flow proceeds to step S75. In step S75, the current value of the variable S is outputted as an overprint prediction value. One color is identified by the overprint prediction value for the stimulus value X, the overprint prediction value for the stimulus value Y, and the overprint prediction value for the stimulus value Z.

In the present modification, the first stimulus value obtaining step is achieved by step S71, and the calculation step is achieved by step S73.

FIG. 16 is a flowchart showing the procedure of the main calculation process in the present modification. After the main calculation process is started, values of a variable S_paper, a variable S_black, a variable c_rate, and a variable solid_paper are firstly set (step S730). Specifically, the value of the variable S_paper is set to the stimulus value of a state where the ink of the (K+1)th printing color is applied on the base material, the value of the variable S_black is set to the stimulus value of a state where the ink of the (K+1)th printing color is applied on black (black solid), the value of the variable c_rate is set to the dot percentage of the ink of the (K+1)th printing color, and the value of the variable solid_paper is set to the stimulus value of a state where the ink of the (K+1)th printing color is applied on the base material at a dot percentage of 100%.

Next, the value of a variable S1 representing the stimulus value of the printing region (stimulus value of the printing region before the ink of the (K+1)th printing color is applied on the ink of the Kth printing color), as in the above Equation (6) (step S731). Next, in the same manner as in the above embodiment, values of a variable trap and a variable c_rate_gain are set (step S732). Next, the value of the variable rate representing the rate of increase in stimulus value due to the calculations that take into account trapping and optical dot gain is calculated, and the value of the variable S_trans is calculated on the basis the value of the variable rate (step S733). In step S733, first, the value of the variable rate is calculated as in the above embodiment. Then, the value of the variable S_trans is calculated in the same manner as in the above Equation (9).

Next, the coefficients j1 and k1 included in the first conversion equation are obtained in the same manner as in the above embodiment (step S734). Next, the value of the variable S1 is assigned to $S_b$ of the first conversion equation, and the value of the variable S_paper is assigned to St of the first conversion equation. Thus, the value of the variable S2 is calculated (step S735) (see the above Equation (15)). Next, the coefficients j2 and k2 included in the second conversion equation are obtained in the same manner as in the above embodiment (step S736). Next, the value of the variable S is assigned to $S_b$ of the second conversion equation, and the value of the variable S_paper is assigned to $S_f$ of the second conversion equation. Thus, the value of the variable S is updated (step S737).

Next, as in the above embodiment, the value of the variable cover (printing rate) is updated (step S738). When the process of step S738 ends, the main calculation process ends, and the flow proceeds to step S74 in FIG. 15.

By repeating the main calculation process as described above N−1 times (N is the number of printing colors used to print the unit region to be processed), the stimulus value of a state where the inks of the first printing color to the Nth printing color are sequentially overprinted on the base material is obtained.

Note that the value of the variable S corresponds to the first stimulus value, the value of the variable S1 corresponds to the second stimulus value, the value of the variable S_trans corresponds to the third stimulus value, the value of the variable S_paper corresponds to the fourth stimulus value, the value of the variable paper corresponds to the fifth stimulus value, the value of the variable black corresponds to the sixth stimulus value, the value of the variable S_black corresponds to the seventh stimulus value, and the value of the variable S2 corresponds to the eighth stimulus value.

In the present modification, the second stimulus value calculation step is achieved by step S731, the third stimulus value calculation step is achieved by steps S732 and S733, the first conversion equation calculation step is achieved by step S734, the eighth stimulus value calculation step is achieved by step S735, the second conversion equation calculation step is achieved by step S736, and the first stimulus value update step is achieved by step S737.

Even when the color prediction process is performed as described above using data of tristimulus values instead of reflectance data in the above embodiment, a color obtained by overprinting inks of a plurality of colors can be predicted more accurately than ever before, as in the above embodiment.

<7.2 Modification Regarding Conversion Equation (Second Modification)>

In the above embodiment, the conversion equation (each of the first conversion equation and the second conversion equation) which is an equation for obtaining the reflectance of a state where the background and the foreground overlap on the basis of the product of the reflectance of the background and the reflectance of the foreground is a linear equation. However, the present invention is not limited thereto. A conversion model other than a linear equation can also be adopted as the conversion equation. For example, an equation indicated by the following Equation (16) may be adopted as the conversion equation.

$$R = j \times (R_b \times R_f)^k \quad (16)$$

Figure 17:
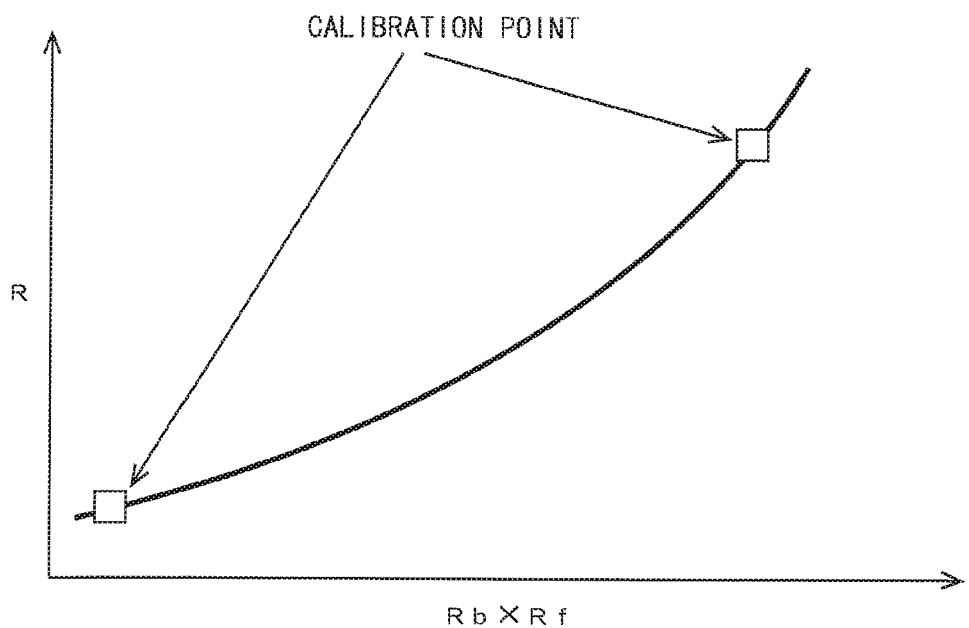
FIG. 17 is a diagram for describing a case where a conversion model other than a linear equation is employed for a conversion equation for obtaining the reflectance of a state where a background and a foreground overlap on the basis of a product of the reflectance of the background and the reflectance of the foreground, regarding a second modification of the embodiment.

Also in this case, the values of the coefficients j and k can be calculated by solving a simultaneous equation consisting of two equations regarding two calibration points (see FIG. 17).

<7.3 Modification Regarding Printing Rate (Third Modification)>

Figure 18:
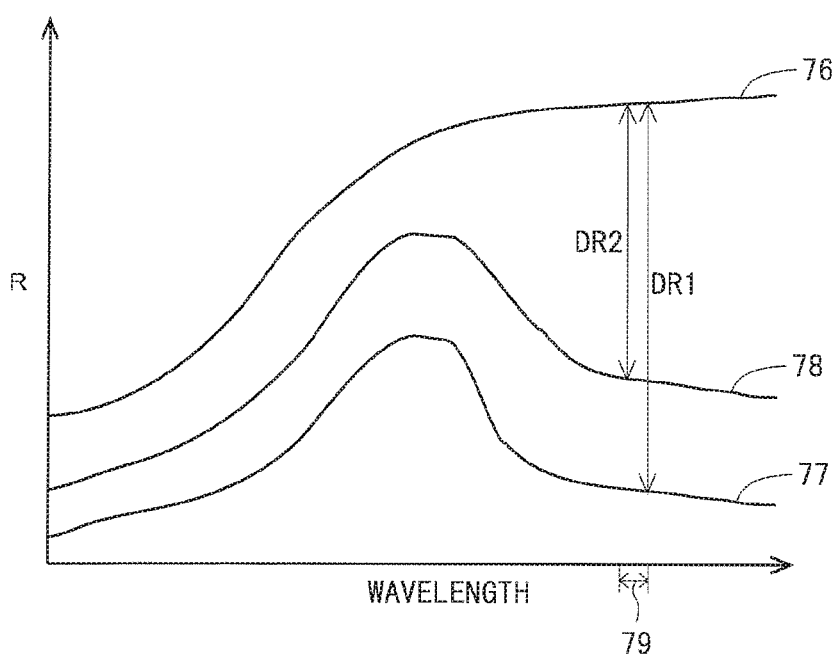
FIG. 18 is a diagram for describing how to obtain a printing rate in a third modification of the embodiment.
Figure 19:
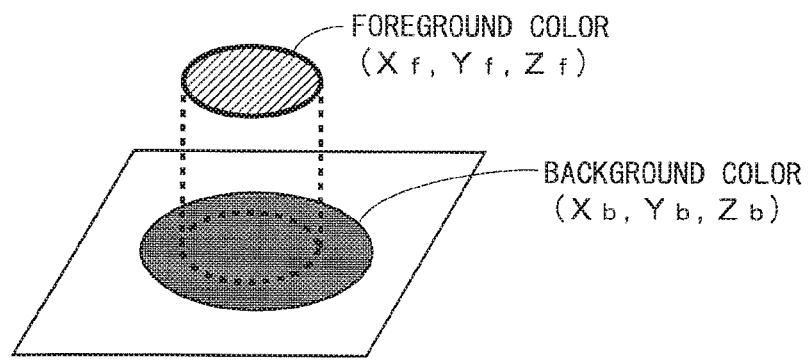
FIG. 19 is a diagram for describing the Deshpande et al. method in relation to the conventional example.

Furthermore, although the printing rate is calculated on the basis of the dot percentage of the printing color in the above embodiment, the present invention is not limited thereto. For example, in a case where the reflectance of the base material for each wavelength is indicated by reference numeral 76 in FIG. 18, the reflectance of a state where an ink of a target printing color is applied on the base material at a dot percentage of 100% for each wavelength is indicated by reference numeral 77 in FIG. 18, and the reflectance of a state where the ink of the target printing color is applied on the base material at a target dot percentage for each wavelength is indicated by reference numeral 78 in FIG. 18, a printing rate cover for a certain wavelength range 79 may be calculated by the following Equation (17).

$$\text{cover} = 1 - (1 - \text{cover}) \times (1 - DR2/DR1) \quad (17)$$

Here, DR2 is a difference between the reflectance indicated by 76 and the reflectance indicated by 78 within the wavelength range 79, and DR1 is a difference between the reflectance indicated by 76 and the reflectance indicated by 77 within the wavelength range 79.

<7.4 Modification Regarding Conversion Equation (Fourth Modification)>

In the above embodiment, the third calibration point P3 is set on the line L1, the line L2 connecting the third calibration point P3 and the fourth calibration point P4 is created, and an overprint prediction value is calculated using the equation representing the line L2 (second conversion equation) (see FIG. 5). However, it is also possible to calculate the overprint prediction value without creating the line L2 (without using the second conversion equation).

Figure 23:
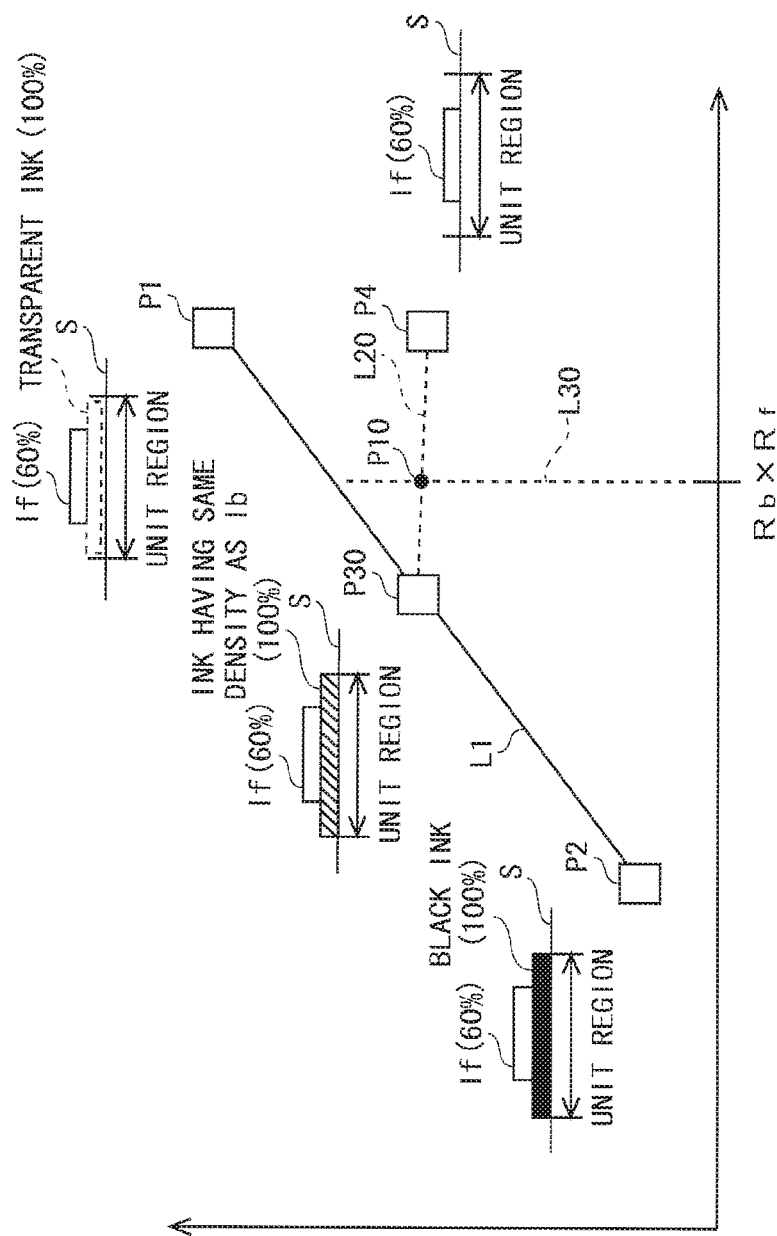
FIG. 23 is a diagram (a diagram showing a color prediction coordinate system) for describing a procedure of a color prediction process in a fourth modification of the embodiment.

That is, such a method can also be adopted in which, after a point indicating the overprint prediction value is mapped on the color prediction coordinate system shown in FIG. 23, the overprint prediction value is obtained by calculating the ordinate value of the point indicating the overprint prediction value.

FIG. 23 is a diagram showing a color prediction coordinate system in which the abscissa indicates the product of the reflectance of the background and the reflectance of the foreground, and the ordinate indicates the reflectance of a state where the background and the foreground overlap. Hereinafter, the procedure of the color prediction process in the present modification will be described with reference to FIG. 23. In the following, a line L1 corresponds to the first line, a line L20 corresponds to the second line, and a line L30 corresponds to the third line.

Here, the case of predicting an overprint value of a printed matter obtained by overprinting a second printing color ink If at a dot percentage of 60% on a first printing color ink Ib which is applied on a base material S at a dot percentage of 40% will be described as an example.

First, the requirements for mapping a point representing an overprint prediction value (referred to as an "overprint point", and the overprint point is denoted by P10) on the coordinate in FIG. 23 will be considered.

First requirement: the abscissa value of the overprint point P10 is indicated as a product of the reflectance when the first printing color ink Ib is applied on the base material S at a dot percentage of 40% and the reflectance when the second printing color ink If is applied on the base material S at a dot percentage of 60%. Therefore, in the color prediction coordinate system, the overprint point P10 is present on the line L30 representing a product of the reflectance of a printed matter obtained by applying the first printing color ink Ib on the base material S at a dot percentage of 40% and the reflectance of a printed matter obtained by applying the second printing color ink If on the base material S at a dot percentage of 60%.

Second requirement: The ordinate value of the overprint point P10 can be obtained by assuming a printed matter in which an ink having the same density as the first printing color ink Ib is applied on the base material S at a predetermined dot percentage, and the second printing color ink If is overprinted thereon at a dot percentage of 60%. First, we consider how coordinates corresponding to a color obtained when the ink having the same density as the first printing color ink Ib is used can be illustrated in FIG. 23. The coordinates corresponding to the printed matter in which the ink is solidly applied on the base material S and the second printing color ink If is overprinted thereon at a dot percentage of 60% are positioned on the line L1 connecting the first calibration point P1 and the second calibration point P2. The reason is that the background color for the second calibration point P2 is a solid of the highest density color (=black) within the expected range, and the background color for the first calibration point P1 is a solid of the lowest density color (=transparent color) within the expected range, and thus, each of the coordinates on the line L1 can assume a solid of a color with any density as a background. Therefore, the coordinates corresponding to the printed matter in which the second printing color ink If is printed at a dot percentage of 60% on a background obtained by solidly applying the ink having the same density as the first printing color ink Ib are also positioned on the line L1. The coordinates corresponding to such a virtual printed matter are defined as a virtual point P30. The overprint point P10 can be obtained by appropriately decreasing, from 100%, the dot percentage of the background ink for the virtual point P30. When the dot percentage of the background ink for the virtual point P30 is decreased from 100% to 0%, the coordinates on the color prediction coordinate system reach the fourth calibration point P4. The reason is that the fourth calibration point P4 is the coordinates corresponding to the printed matter obtained by applying the second printing color ink If on the base material S at a dot percentage of 60%, in other words, the fourth calibration point P4 can be considered to be coordinates corresponding to a printed matter in which the ink having the same density as the first printing color ink Ib is applied on the base material S at a dot percentage of 0% and the second printing color ink If is applied thereon at a dot percentage of 60%. In summary, the coordinates of the overprint point P10 are positioned on the line L20 which is a line connecting the virtual point P30 and the fourth calibration point P4.

Third requirement: The position of the overprint point P10 on the line L20 is specified by the dot percentage of the first printing color ink If for the overprint point P10. That is, since the dot percentage of the first printing color ink If is 0% at the fourth calibration point P4, 40% at the overprint point P10, and 100% at the virtual point P30, the position of the overprint point P10 on the line L20 can be specified by proportionally dividing the distance between the fourth calibration point P4 and the virtual point P30 using the difference value in dot percentage between the fourth calibration point P4 and the overprint point P10 (in this example, the difference value is 40) and the difference value in dot percentage between the overprint point P10 and the virtual point P30 (in this example, the difference value is 60).

The overprint point P10 that satisfies the first to third requirements described above is identified on the coordinates in FIG. 23. This is specifically performed as follows. First, the reflectance of a unit region with a state in which the first printing color ink Ib is applied on the base material S at a dot percentage of 40% is obtained (first reflectance obtaining step). Next, the reflectance of the unit region with a state in which the second printing color ink If is applied on the base material S at a dot percentage of 60% is obtained (fifth reflectance obtaining step). Next, the reflectance of the unit region with a state in which the second printing color ink If is assumed to be applied on a transparent ink is obtained (third reflectance calculation step). Next, the reflectance of the unit region with a state in which a black ink is applied on the base material S at a dot percentage of 100% and the second printing color ink If is applied thereon at a dot percentage of 60% is obtained (seventh reflectance acquisition step). Next, the line L1 is drawn on the color prediction coordinate system shown in FIG. 23 (first line setting step). Next, the line L30 is drawn on the color prediction coordinate system (first requirement) (third line setting step). Next, the fourth calibration point P4 described above is determined in the color prediction coordinate system (fourth coordinate setting step). Next, the overprint point P10 is set on the line L30 as a floating point, and the virtual point P30 is set on the line L1 as a floating point (virtual coordinate setting step). Next, the line L20 connecting the virtual point P30 and the fourth calibration point P4 is drawn on the color prediction coordinate system (second line setting step). Next, the line L20 is rotated about the fourth calibration point P4 (rotation step). Thus, the coordinates of the overprint point P10 change along both the line L20 and the line L30. In this way, the coordinates of the overprint point P10 satisfying both the second and third requirements are searched. After identifying the overprint point P10 that satisfies both the second and third requirements, the ordinate coordinate of the overprint point P10 is outputted as a prediction value of the overprint color of the printed matter in which the first printing color ink Ib is applied on the base material S at a dot percentage of 40% and the second printing color ink If is overprinted thereon at a dot percentage of 60% (color prediction step).

When the dot percentage of the first printing color ink Ib is 100%, the reflectance of the overprint color of the first printing color ink Ib and the second printing color ink If can be obtained only by obtaining an intersection point of the line L1 and the line L30 and calculating the ordinate value of the intersection.

In the above example, it is assumed that the second printing color ink is overprinted on the transparent ink. However, if the reflectance of the first calibration point P1 is obtained by correcting the reflectance of the fourth calibration point P4, the background ink on which the second printing color ink is to be overprinted may not be transparent.

<8. Notes>

From the above disclosure, the configurations described below can be considered.

(Note 1)

A color prediction method for predicting a color obtained by sequentially overprinting, on a base material, inks of a first printing color to an Nth (N is an integer of 2 or more) printing color, the method comprising a first reflectance obtaining step of obtaining, as a first reflectance, a reflectance of a unit region with a state where an ink of the first printing color is applied on the base material, and a calculation step of calculating a reflectance of the unit region, the calculation step being executed (N−1) times, and in the calculation step, during a Kth (K is an integer of 1 or more and N−1 or less) execution, the reflectance of the unit region with a state where inks of the first printing color to a (K+1)th printing color are sequentially overprinted on the base material is calculater, wherein the calculation step includes:

a second reflectance calculation step of calculating, as a second reflectance, a reflectance of a printing region with a state where the ink of the first printing color is applied on the base material, when a value of the K is 1, and of calculating, as a second reflectance, a reflectance of a printing region with a state where an ink of a Kth printing color is overprinted on an ink of a (K−1)th printing color, when the value of the K is 2 or more;

a third reflectance calculation step of calculating, as a third reflectance, a reflectance of the unit region with a state where, assuming that a transparent ink is applied on the base material, an ink of a (K+1)th printing color is overprinted on the transparent ink;

a first conversion equation calculation step of obtaining a first conversion equation representing a line connecting first coordinates and second coordinates regarding a color prediction coordinate system where an abscissa represents a product of a reflectance of a background and a reflectance of a foreground and an ordinate represents a reflectance of a state where the background and the foreground overlap, the first coordinates corresponding to a combination of a product of a fourth reflectance that is a reflectance of the base material and a fifth reflectance that is a reflectance of a state where the ink of the (K+1)th printing color is applied on the base material, and the third reflectance, the second coordinates corresponding to a combination of a product of a sixth reflectance that is a reflectance of a state where a black ink is applied on the base material and the fifth reflectance, and a seventh reflectance that is a reflectance of a state where the ink of the (K+1)th printing color is overprinted on the black ink;

an eighth reflectance calculation step of calculating, as an eighth reflectance, a reflectance of a printing region with a state where the ink of the (K+1)th printing color is overprinted on the ink of the Kth printing color on the basis of the second reflectance and the fifth reflectance, using the first conversion equation;

a second conversion equation calculation step of obtaining a second conversion equation representing a line connecting third coordinates and fourth coordinates regarding the color prediction coordinate system, the third coordinates corresponding to a combination of a product of the second reflectance and the fifth reflectance, and the eighth reflectance, the fourth coordinates corresponding to a combination of a product of the fourth reflectance and the fifth reflectance, and the fifth reflectance; and a first reflectance update step of calculating a reflectance of the unit region with a state where the inks of the first printing color to the (K+1)th printing color are sequentially overprinted on the base material on the basis of the first reflectance and the fifth reflectance, using the second conversion equation, and of updating the first reflectance with the calculated reflectance.

(Note 2)

The color prediction method according to Note 1, wherein, in the third reflectance calculation step, the third reflectance is calculated in consideration of an optical dot gain for the ink of the (K+1)th printing color.

(Note 3)

The color prediction method according to Note 2, wherein, in the third reflectance calculation step, a film thickness ratio is set for the ink of the (K+1)th printing color, the film thickness ratio representing a ratio of a film thickness of an ink after trapping to a film thickness of the ink before trapping, and the third reflectance is calculated by the following equation:

$$c\_trans = c\_paper \times \frac{\left(\frac{solid\_paper}{paper}\right)^{trap} \times c\_rate\_gain + (1 - c\_rate\_gain)}{\frac{solid\_paper}{paper} \times c\_rate + (1 - c\_rate)}$$

where c_trans is the third reflectance, c_paper is the fifth reflectance, solid_paper is a reflectance of a state where the ink of the (K+1)th printing color is applied on the base material at a dot percentage of 100%, paper is the fourth reflectance, trap is the film thickness ratio, c_rate_gain is a dot percentage for the ink of the (K+1)th printing color taking into consideration the optical dot gain, and c_rate is a dot percentage for the ink of the (K+1)th printing color not considering the optical dot gain.

(Note 4)

The color prediction method according to any one of Note 1 to Note 3, further comprising a printing rate calculation step of calculating a printing rate that is a proportion of a printing region to the unit region, the printing rate calculation step being executed earlier than the calculation step, wherein the calculation step further includes a printing rate update step of updating the printing rate, and in the second reflectance calculation step, the second reflectance is calculated by the following equation:

$$r1 = \frac{\frac{r}{paper} + cover - 1}{cover} \times paper$$

where r1 is the second reflectance, r is the first reflectance, cover is the printing rate, and paper is the fourth reflectance.

(Note 5)

The color prediction method according to Note 4, wherein, in the printing rate update step, the printing rate is updated on the basis of the following equation:

$$cover = 1 - (1 - cover) \times (1 - c\_rate)$$

where the cover on the left side is a printing rate after updating, the cover on the right side is a printing rate before updating, and c_rate is a dot percentage of the ink of the (K+1)th printing color.

(Note 6)

The color prediction method according to any one of Note 1 to Note 5, wherein each of the first conversion equation and the second conversion equation is a linear equation, in the first conversion equation calculation step, a value of a coefficient of a first-order term in the linear equation and a value of a constant term in the linear equation are calculated by solving a simultaneous equation consisting of an equation regarding the first coordinates and an equation regarding the second coordinates, and in the second conversion equation calculation step, a value of a coefficient of a first-order term in the linear equation and a value of a constant term in the linear equation are calculated by solving a simultaneous equation consisting of an equation regarding the third coordinates and an equation regarding the fourth coordinates.

(Note 7)

The color prediction method according to any one of Note 1 to Note 6, wherein each of the steps is performed for each wavelength range of a predetermined width.

(Note 8)

A print data generation method for generating print data in a format printable by a digital printing apparatus on the basis of submitted data, the method comprising:

a color prediction step of reading pixel data from the submitted data on a pixel-by-pixel basis, and predicting a color of the read pixel data;

an XYZ data generation step of generating XYZ data representing color tristimulus values X, Y, and Z on the basis of a result obtained in the color prediction step;

a first data conversion step of converting the XYZ data into Lab data that is data of a CIELAB color space; and a second data conversion step of converting the Lab data into print data in a format printable by the digital printing apparatus, wherein, in the color prediction step, color prediction is performed by the color prediction method according to any one of Note 1 to Note 7 for at least one or more of the pixel data.

(Note 9)

A print data generation apparatus that generates print data in a format printable by a digital printing apparatus on the basis of submitted data, the print data generation apparatus comprising:

color prediction means configured to perform a color prediction process in which pixel data is read from the submitted data on a pixel-by-pixel basis, and a color of the read pixel data is predicted;

XYZ data generation means configured to generate XYZ data representing color tristimulus values X, Y, and Z on the basis of a result obtained by the color prediction process;

first data conversion means configured to convert the XYZ data into Lab data that is data of a CIELAB color space; and second data conversion means configured to convert the Lab data into print data in a format printable by the digital printing apparatus, wherein the color prediction process includes a process for predicting a color obtained by sequentially overprinting, on a base material, inks of a first printing color to an Nth (N is an integer of 2 or more) printing color, the color prediction means includes first reflectance obtaining means configured to obtain, as a first reflectance, a reflectance of a unit region with a state where an ink of the first printing color is applied on the base material, and calculation means configured to perform a calculation process which is executed (N−1) times for pixel data of one pixel, and in the calculation process, during a Kth (K is an integer of 1 or more and N−1 or less) execution, a reflectance of the unit region with a state where inks of the first printing color to a (K+1)th printing color are sequentially overprinted on the base material is calculated, and the calculation means includes second reflectance calculation means configured to calculate, as a second reflectance, a reflectance of a printing region with a state where the ink of the first printing color is applied on the base material, when a value of the K is 1, and to calculate, as a second reflectance, a reflectance of a printing region with a state where an ink of a Kth printing color is overprinted on an ink of a (K−1)th printing color, when the value of the K is 2 or more, third reflectance calculation means configured to calculate, as a third reflectance, a reflectance of the unit region with a state where, assuming that a transparent ink is applied on the base material, an ink of a (K+1)th printing color is overprinted on the transparent ink, first conversion equation calculation means configured to obtain a first conversion equation representing a line connecting first coordinates and second coordinates regarding a color prediction coordinate system where an abscissa represents a product of a reflectance of a background and a reflectance of a foreground and an ordinate represents a reflectance of a state where the background and the foreground overlap, the first coordinates corresponding to a combination of a product of a fourth reflectance that is a reflectance of the base material and a fifth reflectance that is a reflectance of a state where the ink of the (K+1)th printing color is applied on the base material, and the third reflectance, the second coordinates corresponding to a combination of a product of a sixth reflectance that is a reflectance of a state where a black ink is applied on the base material and the fifth reflectance, and a seventh reflectance that is a reflectance of a state where the ink of the (K+1)th printing color is overprinted on the black ink, eighth reflectance calculation means configured to calculate, as an eighth reflectance, a reflectance of a printing region with a state where the ink of the (K+1)th printing color is overprinted on the ink of the Kth printing color on the basis of the second reflectance and the fifth reflectance, using the first conversion equation, second conversion equation calculation means configured to obtain a second conversion equation representing a line connecting third coordinates and fourth coordinates regarding the color prediction coordinate system, the third coordinates corresponding to a combination of a product of the second reflectance and the fifth reflectance, and the eighth reflectance, the fourth coordinates corresponding to a combination of a product of the fourth reflectance and the fifth reflectance, and the fifth reflectance, and first reflectance update means configured to calculate a reflectance of the unit region with a state where the inks of the first printing color to the (K+1)th printing color are sequentially overprinted on the base material on the basis of the first reflectance and the fifth reflectance, using the second conversion equation, and to update the first reflectance with the calculated reflectance.

(Note 10)

A color prediction program for predicting a color obtained by sequentially overprinting, on a base material, inks of a first printing color to an Nth (N is an integer of 2 or more) printing color, the program comprising, a first reflectance obtaining step of obtaining, as a first reflectance, a reflectance of a unit region with a state where an ink of the first printing color is applied on the base material, and a calculation step of calculating a reflectance of the unit region, the calculation step being executed (N−1) times, and in the calculation step, during a Kth (K is an integer of 1 or more and N−1 or less) execution, the reflectance of the unit region with a state where inks of the first printing color to a (K+1)th printing color are sequentially overprinted on the base material is calculated, wherein the calculation step includes:

a second reflectance calculation step of calculating, as a second reflectance, a reflectance of a printing region with a state where the ink of the first printing color is applied on the base material, when a value of the K is 1, and of calculating, as a second reflectance, a reflectance of a printing region with a state where an ink of a Kth printing color is overprinted on an ink of a (K−1)th printing color, when the value of the K is 2 or more;

a third reflectance calculation step of calculating, as a third reflectance, a reflectance of the unit region with a state where, assuming that a transparent ink is applied on the base material, an ink of a (K+1)th printing color is overprinted on the transparent ink;

a first conversion equation calculation step of obtaining a first conversion equation representing a line connecting first coordinates and second coordinates regarding a color prediction coordinate system where an abscissa represents a product of a reflectance of a background and a reflectance of a foreground and an ordinate represents a reflectance of a state where the background and the foreground overlap, the first coordinates corresponding to a combination of a product of a fourth reflectance that is a reflectance of the base material and a fifth reflectance that is a reflectance of a state where the ink of the (K+1)th printing color is applied on the base material, and the third reflectance, the second coordinates corresponding to a combination of a product of a sixth reflectance that is a reflectance of a state where a black ink is applied on the base material and the fifth reflectance, and a seventh reflectance that is a reflectance of a state where the ink of the (K+1)th printing color is overprinted on the black ink;

an eighth reflectance calculation step of calculating, as an eighth reflectance, a reflectance of a printing region with a state where the ink of the (K+1)th printing color is overprinted on the ink of the Kth printing color on the basis of the second reflectance and the fifth reflectance, using the first conversion equation;

a second conversion equation calculation step of obtaining a second conversion equation representing a line connecting third coordinates and fourth coordinates regarding the color prediction coordinate system, the third coordinates corresponding to a combination of a product of the second reflectance and the fifth reflectance, and the eighth reflectance, the fourth coordinates corresponding to a combination of a product of the fourth reflectance and the fifth reflectance, and the fifth reflectance; and a first reflectance update step of calculating a reflectance of the unit region with a state where the inks of the first printing color to the (K+1)th printing color are sequentially overprinted on the base material on the basis of the first reflectance and the fifth reflectance, using the second conversion equation, and of updating the first reflectance with the calculated reflectance.

(Note 11)

A color prediction method for predicting a color obtained by sequentially overprinting, on a base material, inks of a first printing color to an Nth (N is an integer of 2 or more) printing color, the method comprising a first stimulus value obtaining step of obtaining, as a first stimulus value, a stimulus value of a unit region with a state where an ink of the first printing color is applied on the base material, and a calculation step of calculating a stimulus value of the unit region, the calculation step being executed (N−1) times, and in the calculation step, during a Kth (K is an integer of 1 or more and N−1 or less) execution, the stimulus value of the unit region with a state where inks of the first printing color to a (K+1)th printing color are sequentially overprinted on the base material is calculated, wherein the stimulus value is any of color tristimulus values X, Y, Z, and the calculation step includes:

a second stimulus value calculation step of calculating, as a second stimulus value, a stimulus value of a printing region with a state where the ink of the first printing color is applied on the base material, when a value of the K is 1, and of calculating, as a second stimulus value, a stimulus value of a printing region with a state where an ink of a Kth printing color is overprinted on an ink of a (K−1)th printing color, when the value of the K is 2 or more;

a third stimulus value calculation step of calculating, as a third stimulus value, a stimulus value of the unit region with a state where, assuming that a transparent ink is applied on the base material, an ink of a (K+1)th printing color is overprinted on the transparent ink;

a first conversion equation calculation step of obtaining a first conversion equation representing a line connecting first coordinates and second coordinates regarding a color prediction coordinate system where an abscissa represents a product of a stimulus value of a background and a stimulus value of a foreground and an ordinate represents a stimulus value of a state where the background and the foreground overlap, the first coordinates corresponding to a combination of a product of a fourth stimulus value that is a stimulus value of the base material and a fifth stimulus value that is a stimulus value of a state where the ink of the (K+1)th printing color is applied on the base material, and the third stimulus value, the second coordinates corresponding to a combination of a product of a sixth stimulus value that is a stimulus value of a state where a black ink is applied on the base material and the fifth stimulus value, and a seventh stimulus value that is a stimulus value of a state where the ink of the (K+1)th printing color is overprinted on the black ink;

an eighth stimulus value calculation step of calculating, as an eighth stimulus value, a stimulus value of a printing region with a state where the ink of the (K+1)th printing color is overprinted on the ink of the Kth printing color on the basis of the second stimulus value and the fifth stimulus value, using the first conversion equation;

a second conversion equation calculation step of obtaining a second conversion equation representing a line connecting third coordinates and fourth coordinates regarding the color prediction coordinate system, the third coordinates corresponding to a combination of a product of the second stimulus value and the fifth stimulus value, and the eighth stimulus value, the fourth coordinates corresponding to a combination of a product of the fourth stimulus value and the fifth stimulus value, and the fifth stimulus value; and a first stimulus value update step of calculating a stimulus value of the unit region with a state where the inks of the first printing color to the (K+1)th printing color are sequentially overprinted on the base material on the basis of the first stimulus value and the fifth stimulus value, using the second conversion equation, and of updating the first stimulus value with the calculated stimulus value.

(Note 12)

A color prediction method for predicting a color obtained by sequentially overprinting an ink of a first printing color and an ink of a second printing color on a base material, the method comprising:

a first reflectance obtaining step of obtaining, as a first reflectance, a reflectance of a unit region with a state where the ink of the first printing color is applied on the base material;

a second reflectance calculation step of calculating, as a second reflectance, a reflectance of a printing region with a state where the ink of the first printing color is applied on the base material;

a third reflectance calculation step of calculating, as a third reflectance, a reflectance of the unit region with a state where, assuming that a transparent ink is applied on the base material, the ink of the second printing color is overprinted on the transparent ink;

a first conversion equation calculation step of obtaining a first conversion equation representing a line connecting first coordinates and second coordinates regarding a color prediction coordinate system where an abscissa represents a product of a reflectance of a background and a reflectance of a foreground and an ordinate represents a reflectance of a state where the background and the foreground overlap, the first coordinates corresponding to a combination of a product of a fourth reflectance that is a reflectance of the base material and a fifth reflectance that is a reflectance of a state where the ink of the second printing color is applied on the base material, and the third reflectance, the second coordinates corresponding to a combination of a product of a sixth reflectance that is a reflectance of a state where a black ink is applied on the base material and the fifth reflectance, and a seventh reflectance that is a reflectance of a state where the ink of the second printing color is overprinted on the black ink;

an eighth reflectance calculation step of calculating, as an eighth reflectance, a reflectance of the printing region with a state where the ink of the second printing color is overprinted on the ink of the first printing color on the basis of the second reflectance and the fifth reflectance, using the first conversion equation;

a second conversion equation calculation step of obtaining a second conversion equation representing a line connecting third coordinates and fourth coordinates regarding the color prediction coordinate system, the third coordinates corresponding to a combination of a product of the second reflectance and the fifth reflectance, and the eighth reflectance, the fourth coordinates corresponding to a combination of a product of the fourth reflectance and the fifth reflectance, and the fifth reflectance; and a prediction value calculation step of calculating a reflectance of the unit region with a state where the ink of the first printing color and the ink of the second printing color are sequentially overprinted on the base material on the basis of the first reflectance and the fifth reflectance, using the second conversion equation.

(Note 13)

A color prediction method for predicting a color obtained by applying an ink of a first printing color on a base material at a printing rate of 100%, and overprinting an ink of a second printing color on the ink of the first printing color at a predetermined printing rate, the method comprising:

a first reflectance obtaining step of obtaining, as a first reflectance, a reflectance of a unit region with a state where the ink of the first printing color is applied on the base material;

a fifth reflectance obtaining step of obtaining, as a fifth reflectance, a reflectance of the unit region with a state where the ink of the second printing color is applied on the base material;

a third reflectance calculation step of calculating, as a third reflectance, a reflectance of the unit region with a state where the ink of the second printing color is assumed to be applied not on the base material but on a transparent ink, by correcting the fifth reflectance in consideration of a variation in at least one of a film thickness and a dot gain of the ink of the second printing color;

a first conversion equation calculation step of obtaining a first conversion equation representing a line connecting first coordinates and second coordinates regarding a color prediction coordinate system where an abscissa represents a product of a reflectance of a background and a reflectance of a foreground and an ordinate represents a reflectance of a state where the background and the foreground overlap, the first coordinates corresponding to a combination of a product of a fourth reflectance that is a reflectance of the base material and the fifth reflectance, and the third reflectance, the second coordinates corresponding to a combination of a product of a sixth reflectance that is a reflectance of a state where a black ink is applied on the base material and the fifth reflectance, and a seventh reflectance that is a reflectance of a state where the ink of the second printing color is overprinted on the black ink; and a prediction value calculation step of calculating a reflectance of the unit region with a state where the ink of the first printing color is applied on the base material at a printing rate of 100% and the ink of the second printing color is overprinted on the ink of the first printing color at a predetermined printing rate on the basis of the first reflectance and the fifth reflectance, using the first conversion equation.

(Note 14)

A color prediction method for predicting a color obtained by applying an ink of a first printing color on a base material at a first dot percentage, and overprinting an ink of a second printing color on the ink of the first printing color at a second dot percentage, the method comprising:

a first reflectance obtaining step of obtaining, as a first reflectance, a reflectance of a unit region with a state where the ink of the first printing color is applied on the base material at the first dot percentage;

a fifth reflectance obtaining step of obtaining, as a fifth reflectance, a reflectance of the unit region with a state where the ink of the second printing color is applied on the base material at the second dot percentage;

a third reflectance calculation step of calculating, as a third reflectance, a reflectance of the unit region with a state where the ink of the second printing color is assumed to be applied not on the base material but on a transparent ink, by correcting the fifth reflectance in consideration of a variation in at least one of a film thickness and a dot gain of the ink of the second printing color;

a seventh reflectance obtaining step of obtaining, as a seventh reflectance, a reflectance of the unit region with a state where a black ink is applied on the base material at a dot percentage of 100% and the ink of the second printing color is further applied on the black ink at the second dot percentage;

a first line setting step of determining a first line connecting first coordinates and second coordinates regarding a color prediction coordinate system where an abscissa represents a product of a reflectance of a background and a reflectance of a foreground and an ordinate represents a reflectance of a state where the background and the foreground overlap, the first coordinates corresponding to a combination of a product of a fourth reflectance that is a reflectance of the base material and the fifth reflectance, and the third reflectance, the second coordinates corresponding to a combination of a product of a sixth reflectance that is a reflectance of a state where a black ink is applied on the base material at a dot percentage of 100% and the fifth reflectance, and the seventh reflectance;

a third line setting step of determining a third line representing a product of the first reflectance and the fifth reflectance in the color prediction coordinate system;

a fourth coordinate setting step of determining, as fourth coordinates, coordinates corresponding to a combination of a product of the fourth reflectance and the fifth reflectance, and the fifth reflectance, in the color prediction coordinate system;

a virtual coordinate setting step of determining virtual coordinates on the first line, the virtual coordinates representing a reflectance of a state where the ink of the first printing color is applied on the base material at a dot percentage of 100% and the ink of the second printing color is applied on the ink of the first printing color at the second dot percentage;

a second line setting step of determining a second line connecting the virtual coordinates and the fourth coordinates in the color prediction coordinate system;

a rotation step of rotating the second line about the fourth coordinates such that, assuming overprint coordinates positioned on both the second line and the third line, the overprint coordinates proportionally divide the third line in a ratio based on the first dot percentage; and a color prediction step of predicting an ordinate value of the overprint coordinates determined in the rotation step as a color obtained by applying the ink of the first printing color on the base material at the first dot percentage and overprinting the ink of the second printing color on the ink of the first printing color at the second dot percentage.

<9. Others>

While the present invention has been described in detail above, the above description is illustrative in all aspects and is not restrictive. It is understood that numerous other modifications and variations can be devised without departing from the scope of the invention.

This application is an application claiming priority based on Japanese Patent Application No. 2018-140921 entitled "Color Prediction Method, Print Data Generation Method, Print Data Generation Apparatus, and Color Prediction Program" filed on Jul. 27, 2018, and the contents of which are herein incorporated by reference.

What is claimed is:

1. A color prediction method for predicting a color obtained by sequentially overprinting, on a base material, inks of a first printing color to an Nth (N is an integer of 2 or more) printing color, the method comprising a first reflectance obtaining step of obtaining, as a first reflectance, a reflectance of a unit region with a state where an ink of the first printing color is applied on the base material, and a calculation step of calculating a reflectance of the unit region, the calculation step being executed (N−1) times, and in the calculation step, during a Kth (K is an integer of 1 or more and N−1 or less) execution, the reflectance of the unit region with a state where inks of the first printing color to a (K−1)th printing color are sequentially overprinted on the base material is calculater, wherein the calculation step includes:

a second reflectance calculation step of calculating, as a second reflectance, a reflectance of a printing region with a state where the ink of the first printing color is applied on the base material, when a value of the K is 1, and of calculating, as a second reflectance, a reflectance of a printing region with a state where an ink of a Kth printing color is overprinted on an ink of a (K−1)th printing color, when the value of the K is 2 or more;

a third reflectance calculation step of calculating, as a third reflectance, a reflectance of the unit region with a state where, assuming that a transparent ink is applied on the base material, an ink of a (K+1)th printing color is overprinted on the transparent ink;

a first conversion equation calculation step of obtaining a first conversion equation representing a line connecting first coordinates and second coordinates regarding a color prediction coordinate system where an abscissa represents a product of a reflectance of a background and a reflectance of a foreground and an ordinate represents a reflectance of a state where the background and the foreground overlap, the first coordinates corresponding to a combination of a product of a fourth reflectance that is a reflectance of the base material and a fifth reflectance that is a reflectance of a state where the ink of the (K+1)th printing color is applied on the base material, and the third reflectance, the second coordinates corresponding to a combination of a product of a sixth reflectance that is a reflectance of a state where a black ink is applied on the base material and the fifth reflectance, and a seventh reflectance that is a reflectance of a state where the ink of the (K+1)th printing color is overprinted on the black ink;

an eighth reflectance calculation step of calculating, as an eighth reflectance, a reflectance of a printing region with a state where the ink of the (K+1)th printing color is overprinted on the ink of the Kth printing color on the basis of the second reflectance and the fifth reflectance, using the first conversion equation;

a second conversion equation calculation step of obtaining a second conversion equation representing a line connecting third coordinates and fourth coordinates regarding the color prediction coordinate system, the third coordinates corresponding to a combination of a product of the second reflectance and the fifth reflectance, and the eighth reflectance, the fourth coordinates corresponding to a combination of a product of the fourth reflectance and the fifth reflectance, and the fifth reflectance; and a first reflectance update step of calculating a reflectance of the unit region with a state where the inks of the first printing color to the (K+1)th printing color are sequentially overprinted on the base material on the basis of the first reflectance and the fifth reflectance, using the second conversion equation, and of updating the first reflectance with the calculated reflectance.

2. The color prediction method according to claim 1, wherein, in the third reflectance calculation step, the third reflectance is calculated in consideration of an optical dot gain for the ink of the (K+1)th printing color.

3. The color prediction method according to claim 2, wherein, in the third reflectance calculation step, a film thickness ratio is set for the ink of the (K+1)th printing color, the film thickness ratio representing a ratio of a film thickness of an ink after trapping to a film thickness of the ink before trapping, and the third reflectance is calculated by the following equation:

$$c\_trans = c\_paper \times \frac{\left(\frac{solid\_paper}{paper}\right)^{trap} \times c\_rate\_gain + (1 - c\_rate\_gain)}{\frac{solid\_paper}{paper} \times c\_rate + (1 - c\_rate)}$$

where c_trans is the third reflectance, c_paper is the fifth reflectance, solid_paper is a reflectance of a state where the ink of the (K+1)th printing color is applied on the base material at a dot percentage of 100%, paper is the fourth reflectance, trap is the film thickness ratio, c_rate_gain is a dot percentage for the ink of the (K+1)th printing color taking into consideration the optical dot gain, and c_rate is a dot percentage for the ink of the (K+1)th printing color not considering the optical dot gain.

4. The color prediction method according to claim 1, further comprising a printing rate calculation step of calculating a printing rate that is a proportion of a printing region to the unit region, the printing rate calculation step being executed earlier than the calculation step,
wherein the calculation step further includes a printing rate update step of updating the printing rate, and
in the second reflectance calculation step, the second reflectance is calculated by the following equation:

$$r1 = \frac{\frac{r}{paper} + cover - 1}{cover} \times paper$$

where r1 is the second reflectance, r is the first reflectance, cover is the printing rate, and paper is the fourth reflectance.

5. The color prediction method according to claim 4, wherein, in the printing rate update step, the printing rate is updated on the basis of the following equation:

$$cover=1-(1-cover) \times (1-c\_rate)$$

where the cover on the left side is a printing rate after updating, the cover on the right side is a printing rate before updating, and c_rate is a dot percentage of the ink of the (K+1)th printing color.

6. The color prediction method according to claim 1, wherein
each of the first conversion equation and the second conversion equation is a linear equation,
in the first conversion equation calculation step, a value of a coefficient of a first-order term in the linear equation and a value of a constant term in the linear equation are calculated by solving a simultaneous equation consisting of an equation regarding the first coordinates and an equation regarding the second coordinates, and
in the second conversion equation calculation step, a value of a coefficient of a first-order term in the linear equation and a value of a constant term in the linear equation are calculated by solving a simultaneous equation consisting of an equation regarding the third coordinates and an equation regarding the fourth coordinates.

7. The color prediction method according to claim 1, wherein each of the steps is performed for each wavelength range of a predetermined width.

8. A print data generation method for generating print data in a format printable by a digital printing apparatus on the basis of submitted data, the method comprising:
a color prediction step of reading pixel data from the submitted data on a pixel-by-pixel basis, and predicting a color of the read pixel data;
an XYZ data generation step of generating XYZ data representing color tristimulus values X, Y, and Z on the basis of a result obtained in the color prediction step;
a first data conversion step of converting the XYZ data into Lab data that is data of a CIELAB color space; and
a second data conversion step of converting the Lab data into print data in a format printable by the digital printing apparatus,
wherein, in the color prediction step, color prediction is performed by the color prediction method according to claim 1 for at least one or more of the pixel data.

9. A color prediction method for predicting a color obtained by sequentially overprinting, on a base material, inks of a first printing color to an Nth (N is an integer of 2 or more) printing color, the method comprising a first stimulus value obtaining step of obtaining, as a first stimulus value, a stimulus value of a unit region with a state where an ink of the first printing color is applied on the base material, and
a calculation step of calculating a stimulus value of the unit region, the calculation step being executed (N−1) times, and in the calculation step, during a Kth (K is an integer of 1 or more and N−1 or less) execution, the stimulus value of the unit region with a state where inks of the first printing color to a (K+1)th printing color are sequentially overprinted on the base material is calculated,
wherein the stimulus value is any of color tristimulus values X, Y, Z, and
the calculation step includes:
a second stimulus value calculation step of calculating, as a second stimulus value, a stimulus value of a printing region with a state where the ink of the first printing color is applied on the base material, when a value of the K is 1, and of calculating, as a second stimulus value, a stimulus value of a printing region with a state where an ink of a Kth printing color is overprinted on an ink of a (K−1)th printing color, when the value of the K is 2 or more;
a third stimulus value calculation step of calculating, as a third stimulus value, a stimulus value of the unit region with a state where, assuming that a transparent ink is applied on the base material, an ink of a (K+1)th printing color is overprinted on the transparent ink;
a first conversion equation calculation step of obtaining a first conversion equation representing a line connecting first coordinates and second coordinates regarding a color prediction coordinate system where an abscissa represents a product of a stimulus value of a background and a stimulus value of a foreground and an ordinate represents a stimulus value of a state where the background and the foreground overlap, the first coordinates corresponding to a combination of a product of a fourth stimulus value that is a stimulus value of the base material and a fifth stimulus value that is a stimulus value of a state where the ink of the (K+1)th printing color is applied on the base material, and the third stimulus value, the second coordinates corresponding to a combination of a product of a sixth stimulus value that is a stimulus value of a state where a black ink is applied on the base material and the fifth stimulus value, and a seventh stimulus value that is a stimulus value of a state where the ink of the (K+1)th printing color is overprinted on the black ink;
an eighth stimulus value calculation step of calculating, as an eighth stimulus value, a stimulus value of a printing region with a state where the ink of the (K+1)th printing color is overprinted on the ink of the Kth printing color on the basis of the second stimulus value and the fifth stimulus value, using the first conversion equation;
a second conversion equation calculation step of obtaining a second conversion equation representing a line connecting third coordinates and fourth coordinates regarding the color prediction coordinate system, the third coordinates corresponding to a combination of a product of the second stimulus value and the fifth stimulus value, and the eighth stimulus value, the fourth coordinates corresponding to a combination of a product of the fourth stimulus value and the fifth stimulus value, and the fifth stimulus value; and
a first stimulus value update step of calculating a stimulus value of the unit region with a state where the inks of the first printing color to the (K+1)th printing color are sequentially overprinted on the base material on the basis of the first stimulus value and the fifth stimulus value, using the second conversion equation, and of updating the first stimulus value with the calculated stimulus value.

10. A color prediction method for predicting a color obtained by applying an ink of a first printing color on a base material at a first dot percentage, and overprinting an ink of a second printing color on the ink of the first printing color at a second dot percentage, the method comprising:
   a first reflectance obtaining step of obtaining, as a first reflectance, a reflectance of a unit region with a state where the ink of the first printing color is applied on the base material at the first dot percentage;
   a fifth reflectance obtaining step of obtaining, as a fifth reflectance, a reflectance of the unit region with a state where the ink of the second printing color is applied on the base material at the second dot percentage;
   a third reflectance calculation step of calculating, as a third reflectance, a reflectance of the unit region with a state where the ink of the second printing color is assumed to be applied not on the base material but on a transparent ink, by correcting the fifth reflectance in consideration of a variation in at least one of a film thickness and a dot gain of the ink of the second printing color;
   a seventh reflectance obtaining step of obtaining, as a seventh reflectance, a reflectance of the unit region with a state where a black ink is applied on the base material at a dot percentage of 100% and the ink of the second printing color is further applied on the black ink at the second dot percentage;
   a first line setting step of determining a first line connecting first coordinates and second coordinates regarding a color prediction coordinate system where an abscissa represents a product of a reflectance of a background and a reflectance of a foreground and an ordinate represents a reflectance of a state where the background and the foreground overlap, the first coordinates corresponding to a combination of a product of a fourth reflectance that is a reflectance of the base material and the fifth reflectance, and the third reflectance, the second coordinates corresponding to a combination of a product of a sixth reflectance that is a reflectance of a state where a black ink is applied on the base material at a dot percentage of 100% and the fifth reflectance, and the seventh reflectance;
   a third line setting step of determining a third line representing a product of the first reflectance and the fifth reflectance in the color prediction coordinate system;
   a fourth coordinate setting step of determining, as fourth coordinates, coordinates corresponding to a combination of a product of the fourth reflectance and the fifth reflectance, and the fifth reflectance, in the color prediction coordinate system;
   a virtual coordinate setting step of determining virtual coordinates on the first line, the virtual coordinates representing a reflectance of a state where the ink of the first printing color is applied on the base material at a dot percentage of 100% and the ink of the second printing color is applied on the ink of the first printing color at the second dot percentage;
   a second line setting step of determining a second line connecting the virtual coordinates and the fourth coordinates in the color prediction coordinate system;
   a rotation step of rotating the second line about the fourth coordinates such that, assuming overprint coordinates positioned on both the second line and the third line, the overprint coordinates proportionally divide the third line in a ratio based on the first dot percentage; and
   a color prediction step of predicting an ordinate value of the overprint coordinates determined in the rotation step as a color obtained by applying the ink of the first printing color on the base material at the first dot percentage and overprinting the ink of the second printing color on the ink of the first printing color at the second dot percentage.

* * * * *